(12) United States Patent
Miki et al.

(10) Patent No.: US 8,924,759 B2
(45) Date of Patent: Dec. 30, 2014

(54) POWER-SUPPLY CONTROL DEVICE, IMAGE PROCESSING APPARATUS, POWER-SUPPLY CONTROL METHOD, AND COMPUTER-READABLE MEDIUM

(75) Inventors: Masayoshi Miki, Kanagawa (JP); Kei Hatano, Kanagawa (JP); Hirotaka Sasaki, Kanagawa (JP); Wenxi Sun, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 410 days.

(21) Appl. No.: 13/476,593

(22) Filed: May 21, 2012

(65) Prior Publication Data
US 2013/0073887 A1 Mar. 21, 2013

(30) Foreign Application Priority Data
Sep. 15, 2011 (JP) .................. 2011-202396

(51) Int. Cl.
- G06F 1/00 (2006.01)
- G06F 1/26 (2006.01)
- G06F 1/32 (2006.01)
- H04N 1/00 (2006.01)

(52) U.S. Cl.
CPC ............ *G06F 1/3231* (2013.01); *G06F 1/3284* (2013.01); *G06F 1/3287* (2013.01); *H04N 1/00323* (2013.01); *H04N 1/00896* (2013.01); *H04N 2201/0094* (2013.01); *Y02B 60/1267* (2013.01); *Y02B 60/32* (2013.01)
USPC ........... 713/323; 713/300; 713/310; 713/320; 713/322

(58) Field of Classification Search
USPC .......................... 713/300, 310, 320, 322, 323
See application file for complete search history.

(56) References Cited

U.S. PATENT DOCUMENTS

| | | | | |
|---|---|---|---|---|
| 6,987,454 | B2 * | 1/2006 | Narayanaswami et al. | ............ 340/572.1 |
| 8,352,768 | B2 * | 1/2013 | Starr et al. | ............ 713/323 |
| 8,495,753 | B2 * | 7/2013 | Motoyama et al. | ............ 726/30 |
| 2003/0051181 | A1 * | 3/2003 | Magee et al. | ............ 713/320 |
| 2011/0296217 | A1 * | 12/2011 | Nishimura et al. | ............ 713/323 |
| 2012/0032894 | A1 * | 2/2012 | Parivar et al. | ............ 345/173 |

FOREIGN PATENT DOCUMENTS

| | | |
|---|---|---|
| JP | 05-045471 A | 2/1993 |
| JP | 07-114308 A | 5/1995 |
| JP | 09-166943 A | 6/1997 |
| JP | 2002-006686 A | 1/2002 |

* cited by examiner

Primary Examiner — Zahid Choudhury
(74) Attorney, Agent, or Firm — Sughrue Mion, PLLC

(57) ABSTRACT

A power-supply control device includes a transition section, a body-capable-of-movement detection section, a return control section, a reference-time-period setting section, a state determination section, and a correction section. The transition section shifts a state of an operation target section from one state to another state among a power-supply state and multiple types of non-power-supply states. The body-capable-of-movement detection section detects a body capable of movement. The return control section controls the transition section so as to return the state of the operation target section to the power-supply state. The reference-time-period setting section sets a reference time period. The state determination section checks a state of detection of the body capable of movement after the reference time period elapses. The correction section corrects the reference time period on the basis of detection position information.

13 Claims, 15 Drawing Sheets

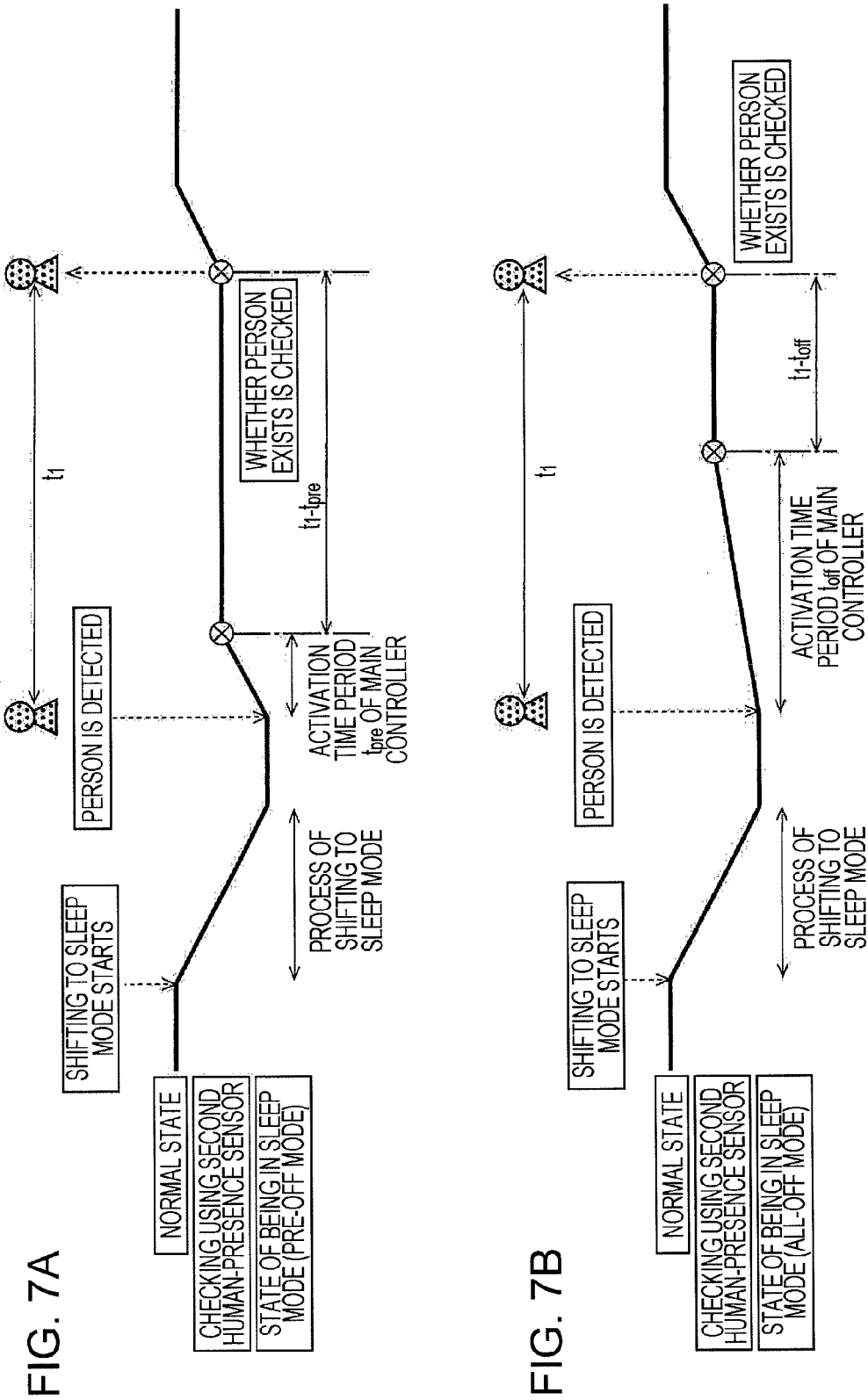

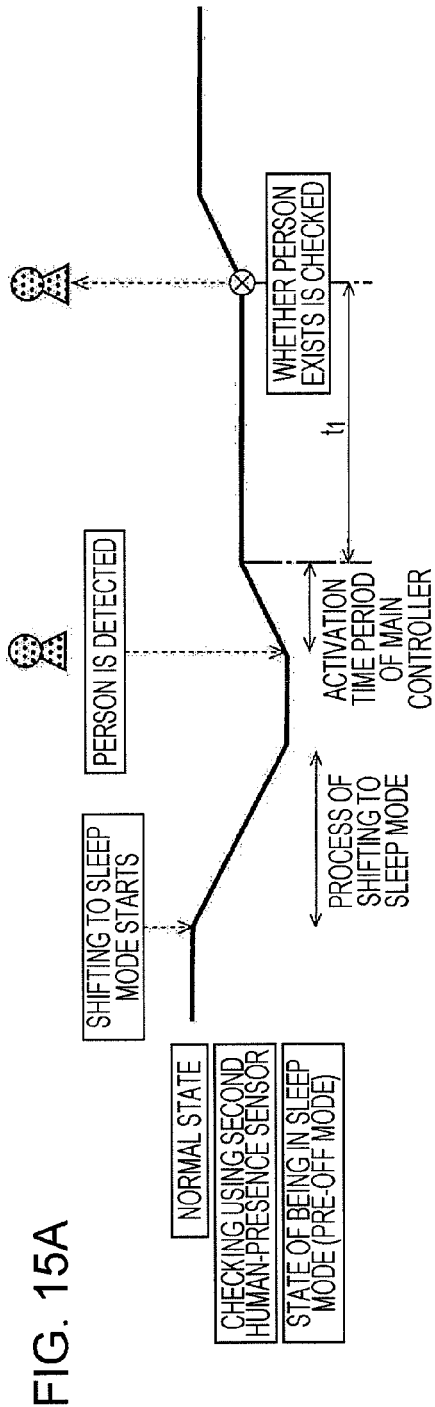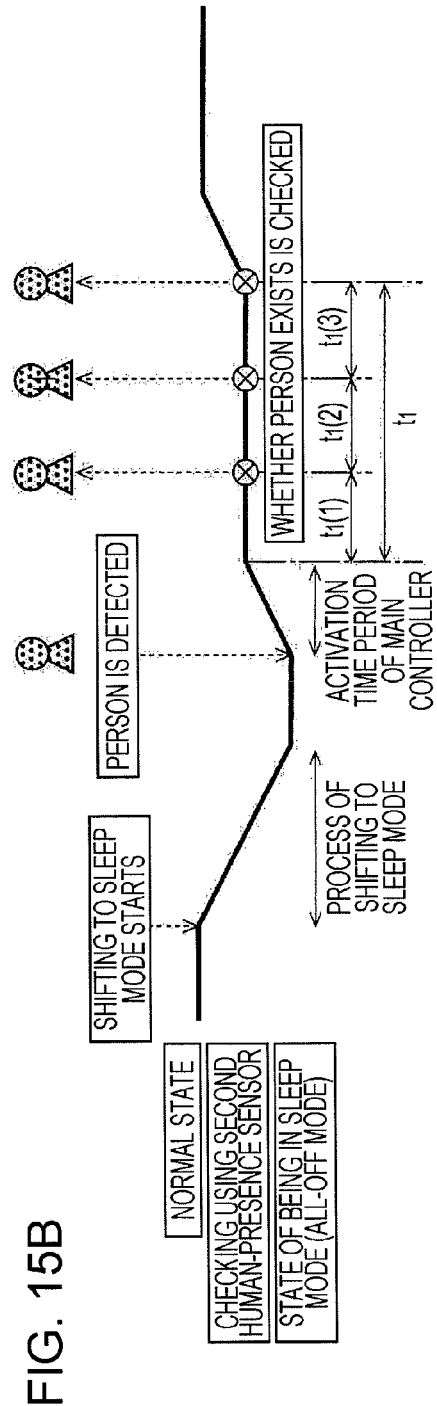

POWER-SUPPLY CONTROL DEVICE, IMAGE PROCESSING APPARATUS, POWER-SUPPLY CONTROL METHOD, AND COMPUTER-READABLE MEDIUM

CROSS-REFERENCE TO RELATED APPLICATIONS

This application is based on and claims priority under 35 USC 119 from Japanese Patent Application No. 2011-202396 filed Sep. 15, 2011.

BACKGROUND (i) Technical Field

The present invention relates to a power-supply control device, an image processing apparatus, a power-supply control method, and a computer-readable medium.

(ii) Related Art

Control of a human-presence sensor has been proposed as one of schemes for automation of control of supplying power to an operation target section (a controller, a processing unit, or a load) that is a target to which power is supplied.

SUMMARY

According to an aspect of the invention, there is provided a power-supply control device including a transition section, a body-capable-of-movement detection section, a return control section, a reference-time-period setting section, a state determination section, and a correction section. The transition section shifts a state of an operation target section to a power-supply state or one of multiple types of non-power-supply states, and, in a case of shifting the state of the operation target section to a non-power-supply state, selects a non-power-supply state among the multiple types of non-power-supply states and shifts the state of the operation target section to the selected non-power-supply state. The operation target section is a section which operates by receiving supply of power from a power source section. The power-supply state is a state in which power is supplied to the operation target section. Each of the multiple types of non-power-supply states is a state in which supply of power to the operation target section is interrupted. Shifting from each of the plurality of types of non-power-supply states to the power-supply state takes a corresponding one of return time periods that are relatively different from one another. The body-capable-of-movement detection section detects a body capable of movement including a user who intends to use the operation target section. When the body capable of movement is detected by the body-capable-of-movement detection section in each of the multiple types of non-power-supply states, the return control section performs a return process of controlling the transition section so as to return the state of the operation target section to the power-supply state. The return process takes each of activation time periods from a time at which the return process starts to a time at which the return process finishes in a corresponding one of the plurality of types of non-power-supply states. The reference-time-period setting section sets a reference time period on the basis of a longest activation time period among the activation time periods corresponding to the multiple types of non-power-supply states. The reference time period is used for a time at which detection of the body capable of movement with the body-capable-of-movement detection section is performed again. The state determination section checks a state of detection of the body capable of movement with the body-capable-of-movement detection section after the reference time period set by the reference-time-period setting section has elapsed from the time at which the return process started, and determines whether the state of the operation target section which is the power-supply state is to be kept or the state of the operation target section is to be returned to one of the multiple types of non-power-supply states by controlling the transition section. The correction section corrects the reference time period on the basis of detection position information concerning a position at which the body capable of movement is detected by the body-capable-of-movement detection section.

BRIEF DESCRIPTION OF THE DRAWINGS

Exemplary embodiments of the present invention will be described in detail based on the following figures, wherein:

FIGS. 7A and 7B are timing charts of monitoring control that is performed on the basis of a reference time period which is set for activation time periods taken to activate the main controller from different types of sleep modes in the present exemplary embodiment, FIG. 7A illustrates a pre-off mode, and FIG. 7B illustrates an all-off mode;

FIGS. 15A and 15B are timing charts in a case in which detection of a body capable of movement with the second human-presence sensor is performed again multiple times after the main controller has been activated in a modification example;

DETAILED DESCRIPTION

Figure 1:
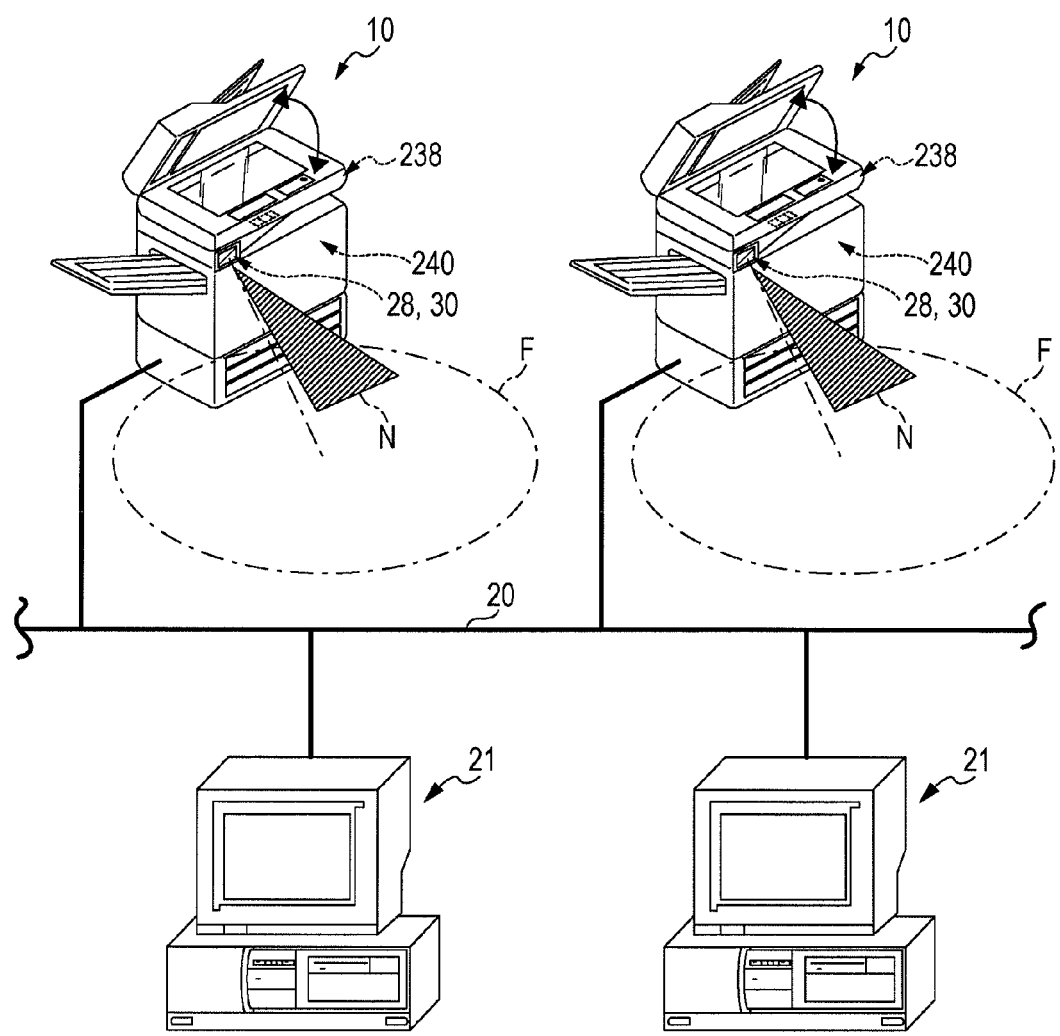
FIG. 1 is a communication-network connection diagram in which an image processing apparatus according to a present exemplary embodiment is included.

As illustrated in FIG. 1, an image processing apparatus 10 according to a present exemplary embodiment is connected to a network-communication network 20 such as the Internet. In FIG. 1, two image processing apparatuses 10 are connected. However, the number of image processing apparatuses 10 that are connected is not limited, and may be one or be three or more.

Furthermore, multiple personal computers (PCs) 21 that serve as information terminal apparatuses are connected to the network-communication network 20. In FIG. 1, two PCs 21 are connected. However, the number of PCs 21 that are connected is not limited, and may be one or be three or more. Moreover, the information terminal apparatuses are not limited to the PCs 21. Additionally, wired connection does not necessarily need to be used for the network-communication network 20. In other words, the network-communication network 20 may be a communication network in which information is transmitted and received using wireless connection.

As illustrated in FIG. 1, regarding each of the image processing apparatuses 10, there is a case in which, for example, a remote operation of transferring data and of providing an instruction for performing image formation (printing) is performed using one of the PCs 21 on the image processing apparatus 10. Alternatively, there is a case in which a user stands up in front of the image processing apparatus 10, and in which the user provides, by performing various types of operations on the image processing apparatus 10, an instruction for performing a process, such as a copy process, a scan process (an image read process), or a facsimile transmission/reception process.

Figure 2:
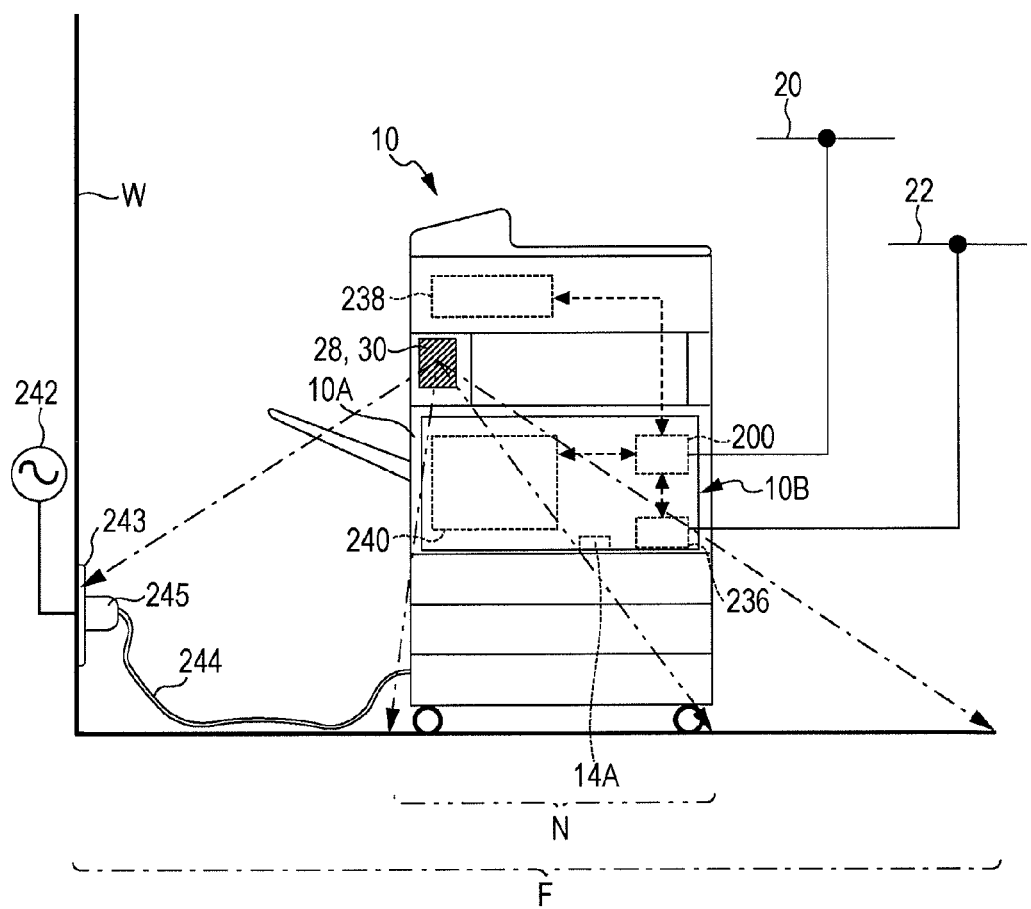
FIG. 2 is a schematic diagram of the image processing apparatus according to the present exemplary embodiment.

FIG. 2 illustrates the image processing apparatus 10 according to the present exemplary embodiment.

The image processing apparatus 10 includes an image forming section 240 that forms an image on a recording sheet, an image reading section 238 that reads a document image, and a facsimile-communication control circuit 236. The image processing apparatus 10 includes a main controller 200. The main controller 200 controls the image forming section 240, the image reading section 238, and the facsimile-communication control circuit 236, thereby temporarily storing image data regarding a document image read by the image reading section 238 or transmitting the read image data to the image forming section 240 or to the facsimile-communication control circuit 236.

The network-communication network 20 such as the Internet is connected to the main controller 200. A telephone network 22 is connected to the facsimile-communication control circuit 236. The main controller 200 is connected to, for example, a host computer via the network-communication network 20. The main controller 200 has a function of receiving image data and a function of performing facsimile reception and facsimile transmission using the telephone network 22 via the facsimile-communication control circuit 236.

In the image reading section 238, a document plate, a scanning drive system, and photoelectric conversion elements are provided. On the document plate, positioning of a document is performed. The scanning drive system scans an image formed on the document that is placed on the document plate, thereby irradiating the image with light. The photoelectric conversion elements, such as charge-coupled devices (CCDs), receive reflected light or transmitted light, which are obtained by scanning the image with the scanning drive system, and convert the reflected light or transmitted light into electric signals.

The image forming section 240 includes a photoconductor drum. Around the photoconductor drum, a charging device, a scanning exposure unit, an image development unit, a transfer unit, and a cleaning unit are provided. The charging device uniformly charges the photoconductor drum. The scanning exposure unit scans the photoconductor drum using a light beam on the basis of image data. The image development unit develops an electrostatic latent image that has been formed by scanning the photoconductor drum with the scanning exposure unit so as to expose the photoconductor drum to the light beam. The transfer unit transfers, onto a recording sheet, an image that has been developed on the photoconductor drum. The cleaning unit cleans the surface of the photoconductor drum after transfer is performed by the transfer unit. Furthermore, a fixing unit that fixes the image which has been transferred onto the recoding sheet is provided along a path along which the recording sheet is transported.

Regarding the image processing apparatus 10, a plug 245 is attached to an end of an input power line 244. The plug 245 is inserted in a plug plate 243 of a mains power source 242 for which installation of wires to a wall surface W is performed, whereby the image processing apparatus 10 receives supply of power from the mains power source 242.

Hardware Configuration of Control System of Image Processing Apparatus

Figure 3:
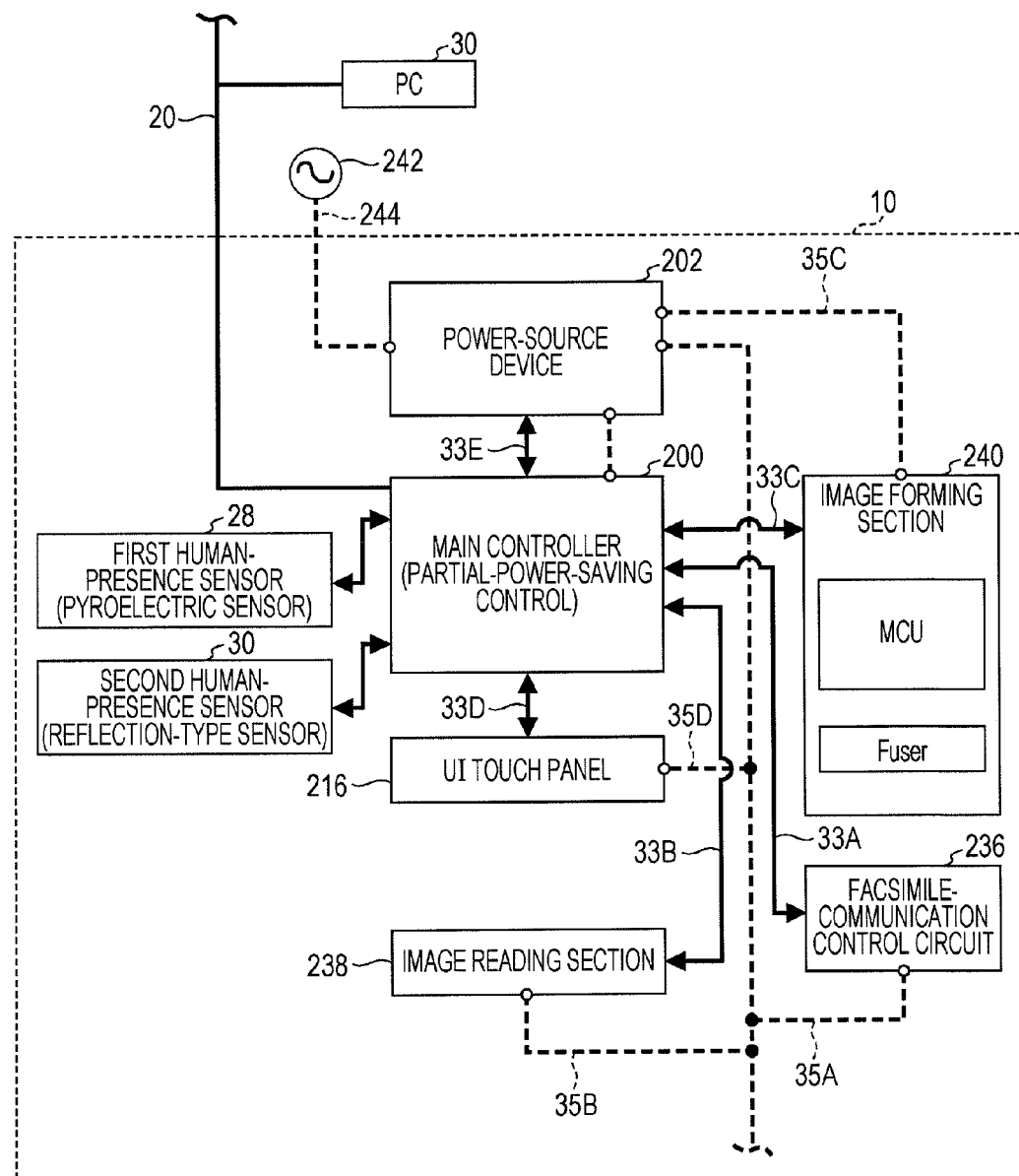
FIG. 3 is a block diagram illustrating a configuration of a control system of the image processing apparatus according to the present exemplary embodiment.

FIG. 3 is a schematic diagram of a hardware configuration of a control system of the image processing apparatus 10.

The network-communication network 20 is connected to the main controller 200. The facsimile-communication control circuit 236, the image reading section 238, the image forming section 240, and a user interface (UI) touch panel 216 are connected to the main controller 200 via buses 33A to 33D, respectively, such as data buses and control buses. In other words, the main controller 200 controls the individual processing sections of the image processing apparatus 10. Note that a backlight part 216BL (see FIG. 4) for a UI touch panel is attached to the UI touch panel 216.

Furthermore, the image processing apparatus 10 includes a power-source device 202, and the power-source device 202 is connected to the main controller 200 via a bus 33E. The power-source device 202 receives supply of power from the mains power source 242. The power-source device 202 is provided with power supply lines 35A to 35D that are used independently of one another so that power is supplied, through each of the power supply lines 35A to 35D, to a corresponding one of the main controller 200, the facsimile-communication control circuit 236, the image reading section 238, the image forming section 240, and the UI touch panel 216. Accordingly, the main controller 200 causes the individual processing sections (devices) to enter a power-supply state (a power-supply mode) that is a mode state in which power is supplied to the individual processing sections (devices) on a processing-section-by-processing-section basis, or to enter a non-power-supply state (a sleep mode) that is a mode state in which supply of power to the individual processing sections is interrupted on a processing-section-byprocessing-section basis. Accordingly, so called partial-power-saving control can be realized by the main controller 200.

Moreover, two human-presence sensors, i.e., a first human-presence sensor 28 and a second human-presence sensor 30, are connected to the main controller 200, and monitor existence/non-existence of a person in the periphery of the image processing apparatus 10. The first human-presence sensor 28 and the second human-presence sensor 30 will be described below.

Functional Block Diagram of Configuration for Partial Power Saving

Figure 4:
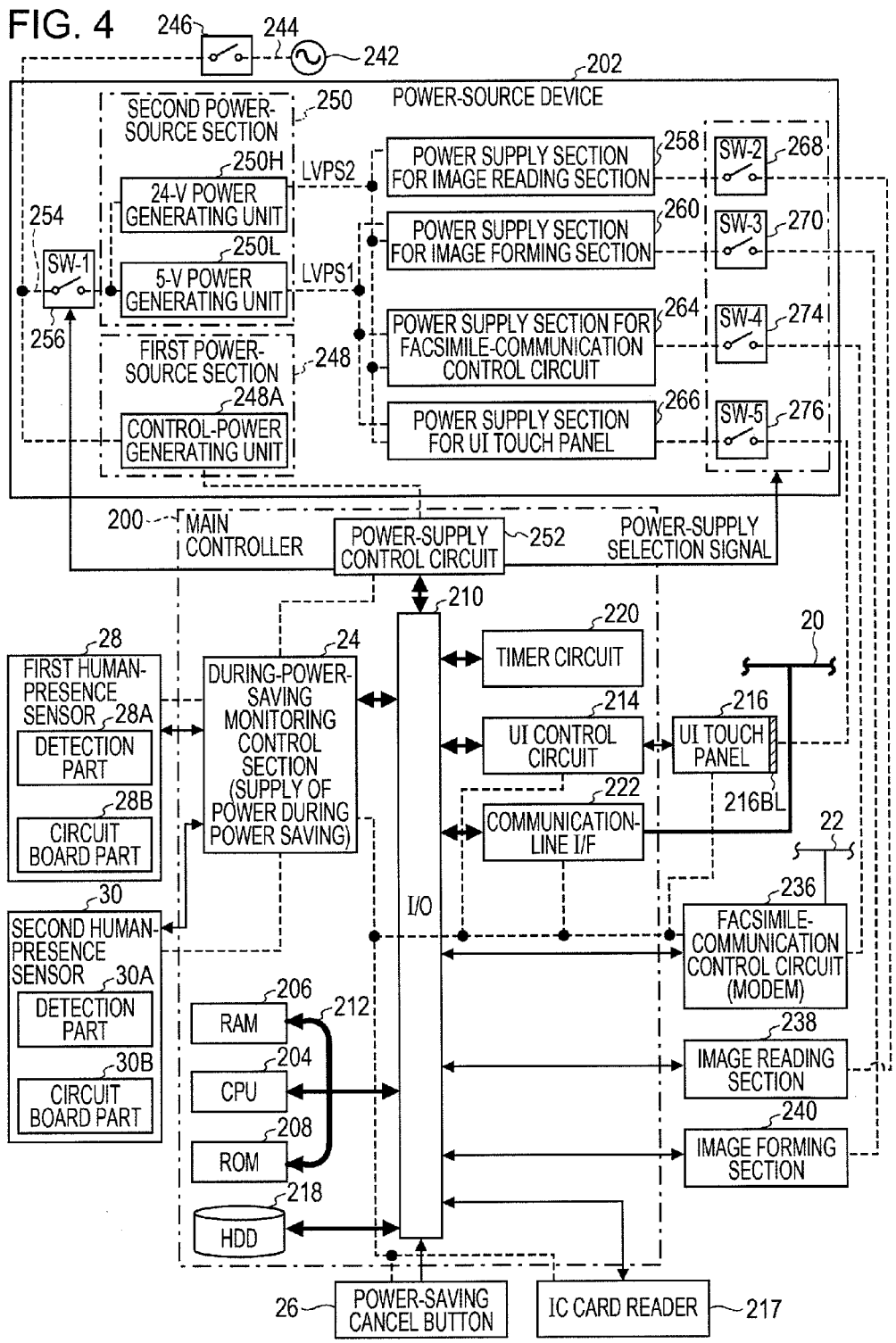
FIG. 4 is a schematic diagram illustrating a main controller and a control system of a power-source device on a function-by-function basis in the present exemplary embodiment.

FIG. 4 is a schematic diagram of a configuration in which the processing sections (which may be referred to as "devices", "modules", or the like) that are controlled by the main controller 200, the main controller 200, and power lines, through which power is supplied to the individual devices, of the power-source device 202, and so forth are provided. In the present exemplary embodiment, supply or non-supply of power can be realized on a processing-section-by-processing-section basis in the image processing apparatus 10 (partial power saving).

Note that partial power saving performed a processing-section-by-processing-section basis is one example. The processing sections may be divided into groups, and control for power saving may be performed on a group-by-group basis. Alternatively, the processing sections may be grouped together, and control for power saving may be performed.

Main Controller 200

As illustrated in FIG. 4, the main controller 200 includes a central processing unit (CPU) 204, a random-access memory (RAM) 206, a read-only memory (ROM) 208, an input/output (I/O) (input/output section) 210, and a bus 212 including a data bus, a control bus, and so forth that are used to connect the CPU 204, the RAM 206, the ROM 208, the I/O 210 to each other. The UI touch panel 216 (including the backlight part 216BL) is connected to the I/O 210 via a UI control circuit 214. Furthermore, a hard disk (HDD) 218 is connected to the I/O 210. The CPU 204 operates in accordance with a program recorded in the ROM 208, the hard disk 218, or the like, thereby realizing functions of the main controller 200. Note that the program may be installed from a recording medium (a compact disc (CD), a digital versatile disk (DVD), blu-ray disc (BD), a universal serial bus (USB) memory, a secure digital (SD) memory, or the like) on which the program is stored, and the CPU 204 may operate in accordance with the program, whereby image processing functions may be realized.

A timer circuit 220 and a communication-line interface (I/F) 222 are connected to the I/O 210. Furthermore, the individual devices, which are the facsimile-communication control circuit (a modem) 236, the image reading section 238, and the image forming section 240, are connected to the I/O 210.

Note that, the timer circuit 220 (hereinafter, may be referred to as a "system timer") measures a time in order to provide an opportunity for setting the facsimile-communication control circuit 236, the image reading section 238, and the image forming section 240 to be in a power-saving state (a non-power-supply state).

Power is supplied from the power-source device 202 to the main controller 200 and the individual devices (the facsimile-communication control circuit 236, the image reading section 238, and the image forming section 240) (see dotted lines illustrated in FIG. 4). Note that, although one line (a dotted line) is illustrated as a power line in FIG. 4, the power line includes a few wiring lines in reality.

Power-Source Device 202

As illustrated in FIG. 4, the input power line 244, which is routed from the mains power source 242, is connected to a main switch 246. The main switch 246 is turned on, whereby supply of power to a first power-source section 248 and a second power-source section 250 becomes enabled.

The first power-source section 248 includes a control-power generating unit 248A. The control-power generating unit 248A is connected to a power-supply control circuit 252 of the main controller 200. The power-supply control circuit 252 supplies power to the main controller 200, and is connected to the I/O 210. The power-supply control circuit 252 performs, in accordance with a control program executed by the main controller 200, switching control for causing electricity to be conducted/not conducted through power-supply lines through which power is supplied to the individual devices (the facsimile-communication control circuit 236, the image reading section 238, and the image forming section 240).

In contrast, regarding a power line 254 that is to be connected to the second power-source section 250, a first sub-power-source switch 256 (hereinafter, may be referred to as a "SW-1") is intervened between the power line 254 and the second power-source section 250. The SW-1 is controlled by the power-supply control circuit 252 so as to be turned on/off.

Furthermore, the second power-source section 250 includes a 24-V power generating unit 250H (LVPS2) and a 5-V power generating unit 250L (LVPS1). The 24-V power generating unit 250H (LVPS2) is a power source that is used, for example, for a motor.

The 24-V power generating unit 250H (LVPS2) and the 5-V power generating unit 250L (LVPS1) of the second power-source section 250 are selectively connected to a power supply section 258 for the image reading section 238, a power supply section 260 for the image forming section 240, a power supply section 264 for the facsimile-communication control circuit 236, and a power supply section 266 for the UI touch panel 216.

The power supply section 258 for the image reading section 238 uses the 24-V power generating unit 250H (LVPS2) as an input source, and is connected to the image reading section 238 via a second sub-power-source switch 268 (hereinafter, may be referred to as a "SW-2").

The power supply section 260 for the image forming section 240 uses the 24-V power generating unit 250H (LVPS2) and the 5-V power generating unit 250L (LVPS1) as input sources, and is connected to the image forming section 240 via a third sub-power-source switch 270 (hereinafter, may be referred to as a "SW-3").

The power supply section 264 for the facsimile-communication control circuit 236 uses the 24-V power generating unit 250H (LVPS2) and the 5-V power generating unit 250L (LVPS1) as input sources, and is connected to the facsimile-communication control circuit 236 via a fourth sub-power-source switch 274 (hereinafter, may be referred to as a "SW-4").

The power supply section 266 for the UI touch panel 216 uses the 5-V power generating unit 250L (LVPS1) and the 24-V power generating unit 250H (LVPS2) as input sources, and is connected to the UI touch panel 216 (including the backlight part 216BL) via a fifth sub-power-source switch 276 (hereinafter, may be referred to as a "SW-5"). Note that power may be supplied to the functions of the UI touch panel 216 (the functions excluding the backlight part 216BL) from the during-power-saving monitoring control section 24.

As in the case of the first sub-power-source switch 256, each of the second sub-power-source switch 268, the third sub-power-source switch 270, the fourth sub-power-source switch 274, and the fifth sub-power-source switch 276 is controlled, in accordance with a power-supply selection signal supplied from the power-supply control circuit 252 of the main controller 200, so as to be turned on/off. Switches and wiring lines that are used to supply power from the 24-V power generating unit 250H and the 5-V power generating unit 250L are configured so as to form two channels, although they are not illustrated. Furthermore, the second sub-power-source switch 268, the third sub-power-source switch 270, the fourth sub-power-source switch 274, and the fifth sub-power-source switch 276 may be disposed in the individual devices to which power is to be supplied, instead of being disposed in the power-source device 202.

In the above-described configuration, the power sources connected so as to select the individual devices (the facsimile-communication control circuit 236, the image reading section 238, and the image forming section 240) on a function-by-function basis are provided, and power is not supplied to devices that are not necessary for a specified function. Accordingly, minimum necessary power is only necessary.

Monitoring Control for Shifting Operation State of Image Processing Apparatus

Here, regarding the main controller 200 in the present exemplary embodiment, in some cases, the functions thereof are partially stopped in order to consume minimum necessary power. Alternatively, in some cases, supply of power to elements including most sections of the main controller 200 is stopped. Such cases are collectively referred to a "sleep mode (a power saving mode)" (see FIG. 5).

For example, the system timer is activated at a point in time when image processing finishes, whereby the operation state of the image processing apparatus 10 can be shifted to the sleep mode. In other words, as a result of measuring a predetermined time with the system timer since activation of the system timer, supply of power is stopped. Note that, if a certain operation is performed (for example, hard keys are operated) before the predetermined time elapses, as a matter of course, measurement of the predetermined time with the system timer, which is performed in order to use for shifting to the sleep mode, is stopped, and the system timer is activated at a point in time when the next image processing finishes.

In contrast, a during-power-saving monitoring control section 24 is provided as an element that always receives supply of power during the sleep mode, and is connected to the I/O 210. The during-power-saving monitoring control section 24 may include, for example, an integrated circuit (IC) chip, which is referred to as an "application-specific integrated circuit (ASIC)", in which an operation program is stored, and which includes a CPU, a RAM, a ROM, and so forth that are processed in accordance with the operation program.

When monitoring during the power saving mode is performed, it is supposed that, for example, a print request is received from a communication-line detector or a facsimile (FAX) reception request is received from a FAX line detector, and, in accordance with the request, the during-power-saving monitoring control section 24 controls the first sub-power-source switch 256, the second sub-power-source switch 268, the third sub-power-source switch 270, the fourth sub-power-source switch 274, and the fifth sub-power-source switch 276 via the power-supply control circuit 252, thereby supplying power to devices that have been set in the power saving mode.

Control of Supply of Power/Interruption of Supply of Power to Main Controller

Furthermore, a power-saving control button 26 (hereinafter, may simply be referred to as a "power-saving button 26") is connected to the I/O 210 of the main controller 200. A user operates the power-saving control button 26 during the power saving mode, whereby the power saving mode can be cancelled. Note that the power-saving control button 26 also has a function of forcibly interrupting supply of power to the processing sections and causing the processing sections to enter the power-saving state, and the function of the power-saving control button 26 is performed by operating the power-saving control button 26 when power is supplied to the processing sections.

Here, in order to perform monitoring in the sleep mode, minimum necessary power may be supplied to the power-saving control button 26 and the individual detectors in addition to the during-power-saving monitoring control section 24 during the power saving mode. In other words, supply of power that is equal to or lower than a value determined in advance (for example, equal to or lower than 0.5 W) and that is necessary for control of determining whether or not power is to be supplied may be received even in the sleep mode that is a non-power-supply state.

Note that a time period for which minimum necessary power that is necessary for input systems including, for example, the main controller 200, the UI touch panel 216, and an IC card reader 217 is being supplied may be provided as a specific time period of the sleep mode. This time period is provided as a result of consideration of convenience to users. Note that, in this case, in the UI touch panel 216, in order to ensure energy saving performance as much as possible, the backlight part 216BL may be turned off, or the lamination thereof may be reduced so as to be lower than usual.

Figure 5:
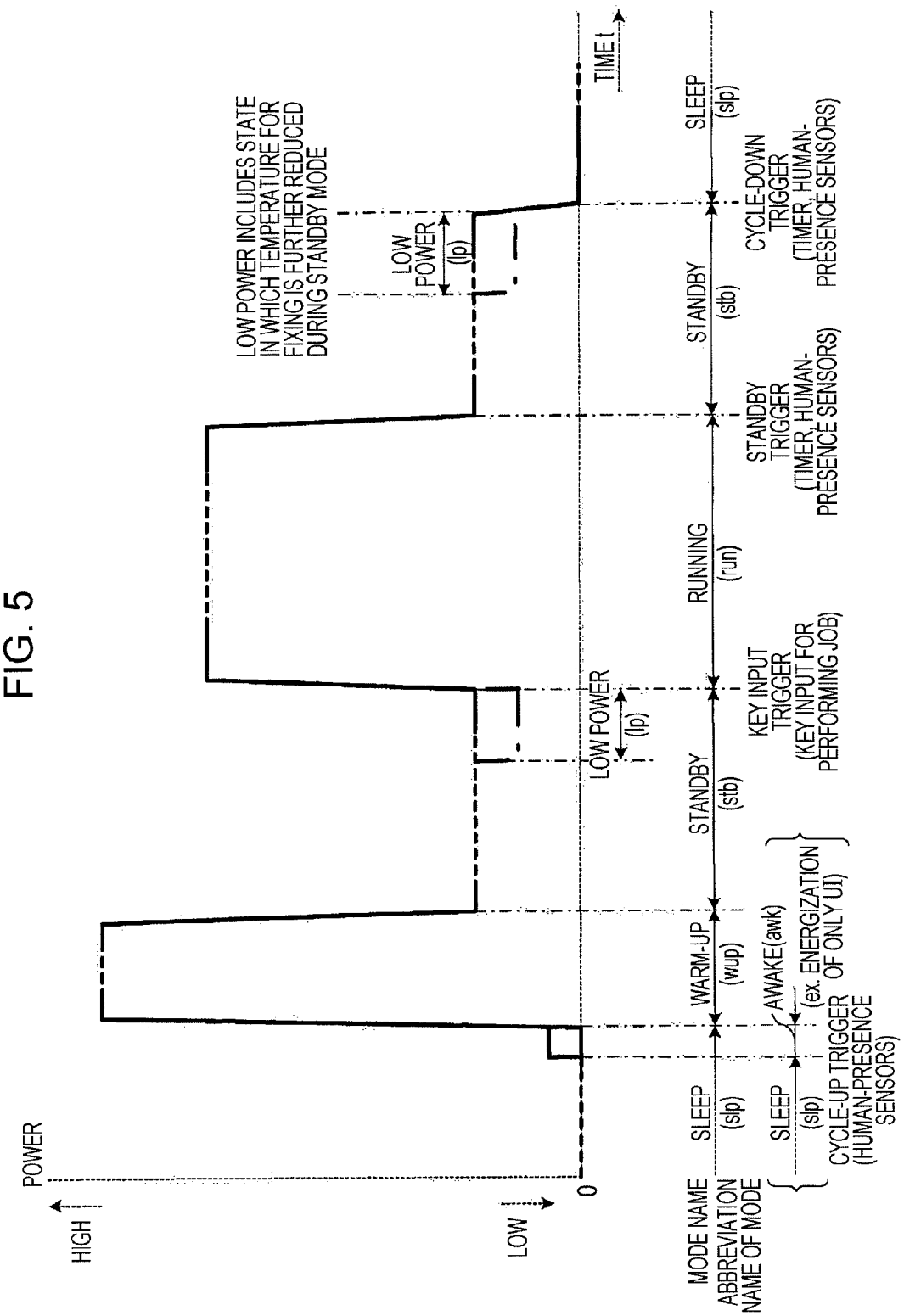
FIG. 5 is a timing chart illustrating individual mode states of the image processing apparatus and events that provide opportunities for shifting from one mode state to another mode state among the mode states.

In FIG. 5, the specific time period is tentatively called, for example, an awake mode (awk), and distinguished from the others. However, the awake mode is not necessarily necessary.

Furthermore, the sleep mode (excluding the awake mode) may be classified into an "all-off mode" and a "pre-off mode" although not illustrated in FIG. 5. In the "all-off mode", a process of initializing the CPU, a wait time until a processing clock is stabilized, and so forth are necessary in the case of activating the main controller 200. In the "pre-off mode", the process of initializing the CPU, the wait time until the processing clock is stabilized, and so forth are unnecessary in the case of activating the main controller 200.

The difference between the "all-off mode" and the "pre-off mode" is a time period taken to activate the main controller 200. In other words, an activation time period $t_{off}$ taken to activate the main controller 200 from the all-off mode is longer than an activation time period $t_{pre}$ taken to activate the main controller 200 from the pre-off mode (which is represented by a relationship $t_{off} > t_{pre}$).

Functions of Human-Presence Sensors

In the sleep mode, when a user stands up in front of the image processing apparatus 10, and, then, performs an operation on the power-saving control button 26 to resume supply of power, there are some cases in which it takes time until the image processing apparatus 10 becomes activated.

For this reason, in the present exemplary embodiment, the first human-presence sensor 28 and the second human-presence sensor 30 are provided in the during-power-saving monitoring control section 24. Additionally, in the sleep mode, the first human-presence sensor 28 and the second human-presence sensor 30 detect a user before the user presses the power-saving control button 26, and supply of power is early resumed, so that the user can quickly use the image processing apparatus 10. Note that, although the power-saving control button 26, the first human-presence sensor 28, and the second human-presence sensor 30 are used in combination, everything may be monitored only by the first human-presence sensor 28 and the second human-presence sensor 30.

As illustrated in FIG. 4, the first human-presence sensor 28 and the second human-presence sensor 30 include detection parts 28A and 30A and circuit board parts 28B and 30B, respectively. The circuit board parts 28B and 30B adjust the sensitivities of signals that have been detected by the detection parts 28A and 30A, respectively, and generate output signals.

Note that, regarding each of the first human-presence sensor 28 and the second human-presence sensor 30, the term "human presence" is used. However, the term "human presence sensor" is a proper noun used in accordance with the present exemplary embodiment. The human-presence sensor at least needs to detect a person. In other words, the human-presence sensor may also detect a body capable of movement other than a person. Accordingly, in the description give below, there are some cases in which a target to be detected by the human-presence sensor is a "person". However, in the future, a robot or the like that performs an operation instead of a person may be included in examples of a target to be detected by the human-presence sensor. Note that, in contrast, when a specific sensor capable of exclusively detecting a person exists, the specific sensor may be applied. Hereinafter, the expressions a "body capable of movement", a "person", a "user", and so forth have the same meaning that is a target to be detected by the first human-presence sensor 28 or the second human-presence sensor 30, and are distinguished from one another as necessary.

First Human-Presence Sensor 28

The specification of the first human-presence sensor 28 in the present exemplary embodiment includes detection of movement of a body capable of movement in the periphery of the image processing apparatus 10 (e.g., in a region ranging from 1 m to 5 m). In this case, the first human-presence sensor 28 is typified by, for example, an infrared ray sensor using a pyroelectric effect of a pyroelectric element (a pyroelectric sensor). In the present exemplary embodiment, a pyroelectric sensor is applied as the first human-presence sensor 28.

The most distinctive feature of the pyroelectric sensor that is applied as the first human-presence sensor 28 and that uses a pyroelectric effect of a pyroelectric element is that the detection region thereof is large. Furthermore, because the sensor detects movement of a body capable of movement, when a person is standing still in the detection region, the sensor does not detect the existence of the person. For example, supposing that a high-level signal is output when a person moves, when the person becomes still in the detection region, the signal changes from the high-level signal to a low-level signal.

Note that, as a matter of course, the meaning of the term "still" in the present exemplary embodiment also includes a state in which a person is completely still, as in a still image captured by a still camera or the like. However, for example, the meaning of the term "still" also includes a state in which a person is standing still in front of the image processing apparatus 10 for the sake of performing an operation. Accordingly, the meaning of the term "still" includes a state in which a person slightly moves in a range that is determined in advance (for example, movement associated with breathing) or a state in which a person moves a hand, a leg, the neck, or the like.

However, when a person does exercises such as stretching exercises in front of the image processing apparatus 10 while waiting for a process such as a process of forming an image or a process of reading an image, the first human-presence sensor 28 may detect the existence of the person.

Accordingly, it is not necessarily necessary to use a scheme in which the sensitivity of the first human-presence sensor 28 is adjusted after the meaning of the term "still" is defined as described above. The sensitivity of the first human-presence sensor 28 may be comparatively roughly and typically adjusted, and may depend on the detection state of a person with the first human-presence sensor 28. In other words, when the first human-presence sensor 28 outputs one of binary signals (for example, a high-level signal), it may be indicated that a person is moving. When a person exists in the detection region of the first human-presence sensor 28 and the other signal of the binary signals (for example, a low-level signal) is output, it may be indicated that the person is standing still.

The specification of the first human-presence sensor 28 in the present exemplary embodiment includes detection of movement of a body capable of movement in the periphery of the image processing apparatus 10 (e.g., in a region ranging from 1 m to 5 m).

Second Human-Presence Sensor 30

In contrast, regarding the specification of the second human-presence sensor 30 in the present exemplary embodiment, a sensor that detects presence/absence (existence/non-existence) of a body capable of movement is applied. The sensor that is applied as the second human-presence sensor 30 is typified by, for example, a reflection-type sensor including a light-projecting unit and a light-receiving unit (a reflection-type sensor). Note that a configuration in which the light-projecting unit and the light-receiving unit are separated from each other may be used.

The most distinctive feature of the reflection-type sensor that is applied as the second human-presence sensor 30 is that the reflection-type sensor reliably detects presence/absence of a body capable of movement in accordance with whether or not light that is to enter the light-receiving unit is interrupted. Furthermore, because the amount of light entering the light-receiving unit is limited by the amount of light projected from the light-projecting unit or the like, the detection region of the second human-presence sensor 30 is a comparatively short region.

Note that, if sensors used as the first human-presence sensor 28 and the second human-presence sensor 30 can individually achieve functions described below, the sensor used as the first human-presence sensor 28 and the sensor used as the second human-presence sensor 30 are not limited to a pyroelectric sensor and a reflection-type sensor, respectively.

Here, in the present exemplary embodiment, the maximum detection regions (e.g., a first region F and a second region N illustrated in FIG. 6) of the first human-presence sensor 28 and the second human-presence sensor 30 are set.

Figure 6:
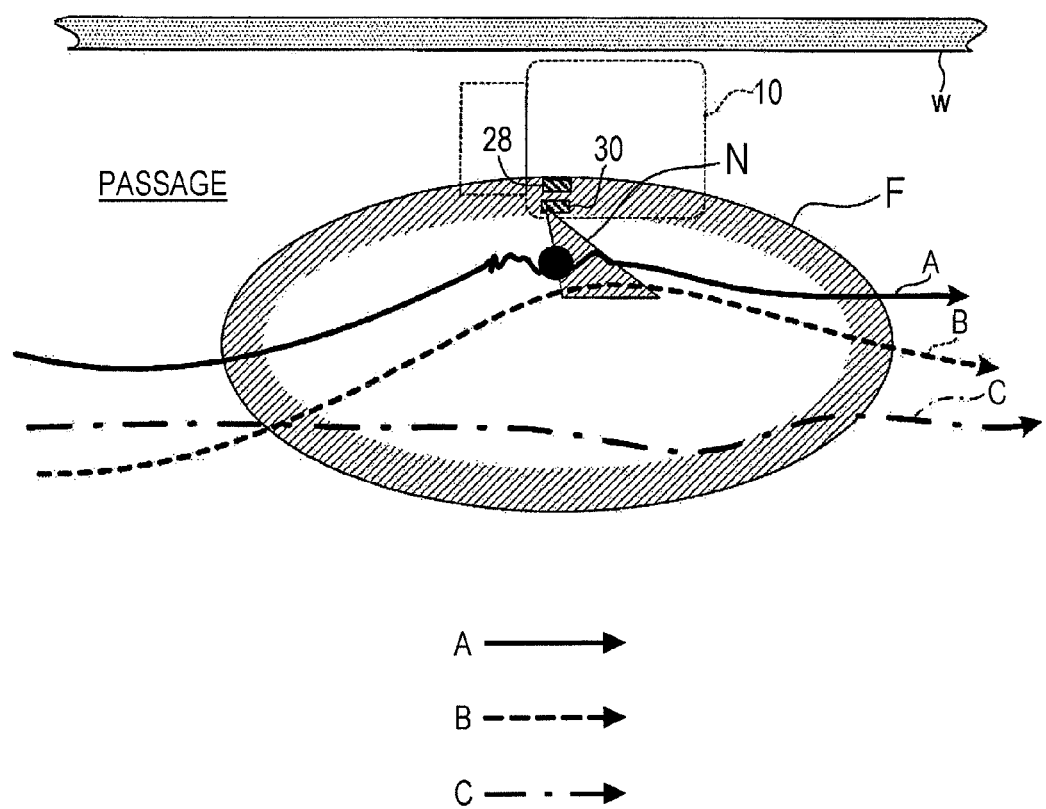
FIG. 6 is a plan view of the image processing apparatus and the periphery thereof in the present exemplary embodiment.

The first region F (hereinafter, may be simply referred to as a "region F") that is a detection region comparatively distant from the image processing apparatus 10 and that is illustrated in FIG. 6 is the detection region of the first human-presence sensor 28. The first human-presence sensor 28 has a function of serving as a distant-body-capable-of-movement detection unit. Furthermore, the second region N (hereinafter, may be simply referred to as a "region N") that is a detection region comparatively near from the image processing apparatus 10 and that is illustrated in FIG. 6 is the detection region of the second human-presence sensor 30. The second human-presence sensor 30 has a function of serving as a near-body-capable-of-movement detection unit.

Regarding the detection region (see the first region F illustrated in FIG. 6) of the first human-presence sensor 28, the critical point (the most distant position) thereof, which serves as a standard, may be located in a range from about 2 m to about 3 m although depending on an environment of a place in which the image processing apparatus 10 is disposed. In contrast, the detection region (see the second region N illustrated in FIG. 6) of the second human-presence sensor 30 is a region in which a user can operate the UI touch panel 216 or the hard keys of the image processing apparatus 10. The critical point (the most distant position) thereof, which serves as a standard, may be located in a range from about 0.3 m to about 1.0 m.

Control of Supplying Power to Sensor

In the present exemplary embodiment, power is not always supplied to the second human-presence sensor 30. At a point in which a body capable of movement (a user) enters the first region F that is under control of the first human-presence sensor 28 and that is illustrated in FIG. 6, power is supplied to the second human-presence sensor 30 and the second human-presence sensor 30 starts operating. After that, at a point in which the body capable of movement (the user) enters the second region N that is under control of the second human-presence sensor 30 and that is illustrated in FIG. 6, an instruction for activation from the sleep mode to a standby mode is provided.

In other words, two human-presence sensors (the first human-presence sensor 28 and the second human-presence sensor 30) having different detection regions cooperate with each other so that minimum necessary power is supplied to the sensors.

In contrast, for interruption of supply of power to the second human-presence sensor 30, in addition to a state of detection of a body capable of movement with the first human-presence sensor 28, a timer function of the during-power-saving monitoring control section 24 is also used. In order to distinguish this timer function from the above-mentioned system timer, the timer function may be referred to as a "sensor timer".

The sensor timer is one of the functions of the during-power-saving monitoring control section 24. In other words, as a matter of course, a control system has an operation clock. A timer may be generated using a clock signal of the operation clock. Alternatively, a counter program that performs counting on a fixed-time-period-by-fixed-time-period basis or a process-by-process basis may be generated.

As illustrated in FIG. 6, the relationships between the a body capable of movement (a user) and the image processing apparatus 10 are broadly classified into three situations: a first situation is a situation in which a person approaches, for the sake of using the image processing apparatus 10, a position at which the person can perform an operation on the image processing apparatus 10 (see movement (a pattern A) indicated by the arrow A illustrated in FIG. 6); a second situation is a situation in which a person approaches, not for the sake of using the image processing apparatus 10, a position at which the person can perform an operation on the image processing apparatus 10 (see movement (a pattern B) indicated by the arrow B illustrated in FIG. 6); and a third situation is a situation in which, although a person does not approach a position at which the person can perform an operation on the image processing apparatus 10, the person reaches a certain position so that the situation may change from the third situation to the first or second situation (see movement (a pattern C) indicated by the arrow C illustrated in FIG. 6).

The pattern A indicates a movement path along which a person approaches a position at which the person can perform an operation on the image processing apparatus 10, along which the person becomes still to perform an operation for the sake of using the image processing apparatus 10, and along which the person moves away from the image processing apparatus 10. The position of the person who moves along the movement path sequentially changes as follows: outside the regions; in the first region F; in the second region N; in the first region F; and outside the regions.

The pattern B indicates a movement path along which a person approaches a position at which the person can perform an operation on the image processing apparatus 10, and along which the person passes by the image processing apparatus 10. The position of the person who moves along the movement path sequentially changes as follows: outside the regions; in the first region F; in the second region N; in the first region F; and outside the regions.

The pattern C indicates a movement path along which a person passes through the vicinity of the image processing apparatus 10 without approaching a position at which the person can perform an operation on the image processing apparatus 10. The position of the person who moves along the movement path sequentially changes as follows: outside the regions; in the first region F; and outside the regions.

In the present exemplary embodiment, a time at which power is supplied to the second human-presence sensor 30 or supply of power to the second human-presence sensor 30 is interrupted is controlled on the basis of detection information concerning detection performed by the first human-presence sensor 28 and measured-time information concerning a time measured by the sensor timer in response to the abode-mentioned movements (situations in which a person moves and which are basically represented by the patterns A to C illustrated in FIG. 6).

Adjustment of Detection Accuracy of Second Human-Presence Sensor 30

Here, detection of a body capable of movement with the second human-presence sensor 30 in the present exemplary embodiment influences control of supplying power after the detection is performed. For example, as in the case of the pattern B illustrated in FIG. 6, when a body capable of movement passes by the second human-presence sensor 30 (passes by the vicinity of the image processing apparatus 10) in the detection region of the second human-presence sensor 30, the during-power-saving monitoring control section 24 provides an instruction for activating at least the main controller 200.

In order to distinguish a case in which a body capable of movement passes by the vicinity of the image processing apparatus 10 and a case in which a body capable of movement utilizes the image processing apparatus 10 in reality from each other, a time period taken for a body capable of movement to pass by the second human-presence sensor 30 is estimated in advance. The state of detection of the body capable of movement with the second human-presence sensor 30 is checked again within the time period.

In other words, as a result of checking the state of detection of the body capable of movement again, when the body capable of movement is still being detected by the second human-presence sensor 30, the body capable of movement is recognized as a user who intends to utilize the image processing apparatus 10. For example, the operation state of the image processing apparatus 10 is shifted to a state in which power is supplied to some of the devices, such as the awake mode. In contrast, as a result of checking the state of detection of the body capable of movement again, when the body capable of movement is no longer detected by the second human-presence sensor 30, the body capable of movement is recognized as a body capable that has passed by the vicinity of the image processing apparatus 10. For example, supply of power to the main controller 200 is interrupted.

The time period taken for a body capable of movement to pass by the second human-presence sensor 30 is set, as an initial setting, to a time period taken to pass by a position that is located a distance of about 0.3 m (30 cm), which is a detection distance of the second human-presence sensor 30, from the image processing apparatus 10. The time period is set as a condition under which power is not supplied to the main controller 200 every time a body capable of movement passes by the vicinity of the image processing apparatus 10, and under which power has already been supplied to the main controller 200 or the like and the main controller 200 or the like has been already activated before data stored on a card is read by the IC card reader 217 or before an operation starts being performed on the UI touch panel 216.

Set Reference Time Period

Here, as described above, whether the main controller 200 is in the "all-off mode" or the "pre-off mode", which are included in the same sleep mode, depends on the immediately previous state of the image processing apparatus 10. For example, when a process such as a copy process finishes and, then, the system timer is activated or the power-saving control button 26 is operated, the main controller 200 is caused to enter the "pre-off mode" (the activation time period $t_{pre}$). In the pre-off mode, then, when a state in which the image processing apparatus 10 is not used has continued for a time period that is determined in advance, the main controller 200 is caused to enter the "all-off mode" (the activation time period $t_{off}$).

Furthermore, regarding the specification of the second human-presence sensor 30, the second human-presence sensor 30 may have an indicator (such as an light emitting diode (LED)) that emits light when the second human-presence sensor 30 detects a body capable of movement, and that stops emission of light when the second human-presence sensor 30 does not detect a body capable of movement.

Accordingly, in the above-mentioned case in which a body capable of movement passes by the second human-presence sensor 30, even when the indicator of the second human-presence sensor 30 emits light, after the main controller 200 has been activated, the second human-presence sensor 30 may detect the body capable of movement again or not detect the body capable of movement again depending on the state of the sleep mode of the main controller 200 (where the relationship "$t_{off}>t_{pre}$" is satisfied for the difference between the activation time period $t_{off}$ and the activation time period $t_{pre}$).

In this case, when the second human-presence sensor 30 detects the body capable of movement again, the main controller 200 keeps the activated state thereof. However, when the second human-presence sensor 30 does not detect the body capable of movement again, the main controller 200 returns to the sleep mode.

This is an event that occurs in the above-mentioned case in which the time period taken for a body capable of movement to pass by the second human-presence sensor 30 is longer than the activation time period $t_{pre}$ and shorter than the activation time period $t_{off}$. For example, a user may feel that something is wrong with the state of the main controller 200 because the state of the main controller 200 is different from an expected state although the user visually recognizes that the indicator emits light.

For this reason, in the present exemplary embodiment, a reference time period is set for a mode state corresponding to the longest activation time period among activation time periods. In other words, in the present exemplary embodiment, two types of activation time periods, i.e., the activation time period $t_{off}$ and the activation time period $t_{pre}$, exist. The activation period time $t_{off}$ and the activation time period $t_{pre}$ have the relationship $t_{off}>t_{pre}$ therebetween. Accordingly, the reference time period is set on the basis of the activation time period $t_{off}$ taken to activate the main controller 200 from the "all-off mode".

FIGS. 7A and 7B are timing charts illustrating cases of shifting from the standby mode to the sleep mode. FIG. 7A illustrates a case in which the sleep mode is the pre-off mode, and FIG. 7B illustrates a case in which the sleep mode is the all-off mode.

A process of shifting from the standby mode (a normal state) to the sleep mode is performed at the same timing for both the pre-off mode and the all-off mode. Note that, although times after a time at which the operation state is shifted to the sleep mode are the same in FIGS. 7A and 7B, first, the operation state may be shifted to the pre-off mode, and, then, may be shifted to the all-off mode.

As illustrated in FIGS. 7A and 7B, a reference time period $t_1$ is set to be a time period that is longer than a longer activation time period of the main controller 200, i.e., the activation time period $t_{off}$ taken to activate the main controller 200 from the all-off mode.

Referring to FIG. 7A, it takes the activation time period (a CPU return time period) $t_{pre}$ to activate the main controller 200 after a body capable of movement is detected by the second human-presence sensor 30. A time at which a time period $(t_1-t_{pre})$ obtained by subtracting the activation time period $t_{pre}$ from the reference time period $t_1$ elapses from the time at which the main controller 200 is activated is a time at which detection of the body capable of movement with the second human-presence sensor 30 is performed again.

In contrast, referring to FIG. 7B, it takes the activation time period (a CPU return time period) $t_{off}$ to activate the main controller 200 after a body capable of movement is detected by the second human-presence sensor 30. A time at which a time period $(t_1-t_{off})$ obtained by subtracting the activation time period $t_{off}$ from the reference time period $t_1$ elapses from the time at which the main controller 200 is activated is a time at which detection of the body capable of movement with the second human-presence sensor 30 is performed again.

As a result, even when the types of sleep modes are different from each other, the time period from when a body capable of movement is first detected to when the body capable of movement is detected again is a fixed time period (the reference time period $t_1$).

Correction of Reference Time Period

Furthermore, in the present exemplary embodiment, after the reference time period $t_1$ is determined as an initial setting, a position at which a body capable of movement will pass by the image processing apparatus 10 is estimated on the basis of the detection region of the second human-presence sensor 30, and the reference time $t_1$ period is corrected.

For example, in a case of setting the reference time period $t_1$, when the reference time period $t_1$ is set to be equal to (or longer than) the longest activation time period of the main controller 200, the user can be prevented from feeling that something is wrong with the state of the main controller 200 when the indicator emits light, and the convenience can be increased. However, when the reference time period $t_1$ is simply set to be the longest activation time period, the energy saving performance that is realized using a shorter activation time period is reduced.

For this reason, in the present exemplary embodiment, both the convenience and the energy saving performance are realized by determining effective values of the second human-presence sensor 30 in reality.

Hereinafter, the effective values of the second human-presence sensor 30 will be described.

Figure 8A:
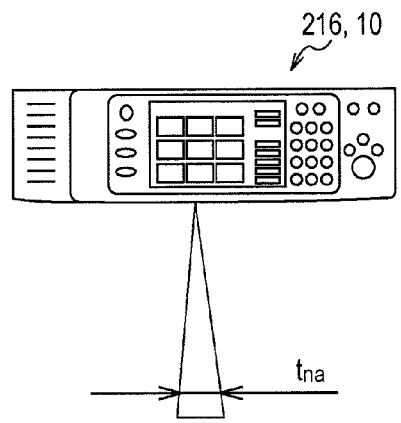
FIGS. 8A and 8B are plan view illustrating relationships between a time period taken to pass by a second human-presence sensor and a detection distance (without inclination)
Figure 8B:
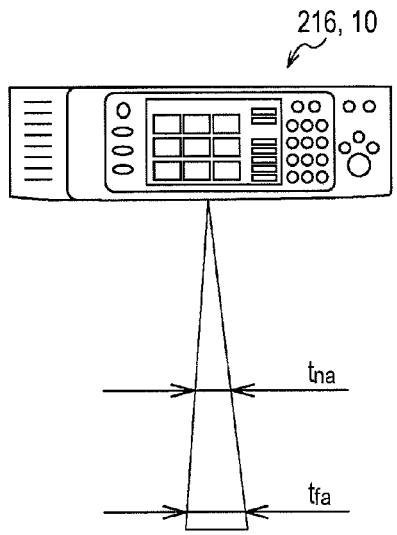

As illustrated in FIGS. 8A and 8B, when the front wall of the image processing apparatus 10 and the sensor optical axis of the second human-presence sensor 30 are orthogonal to each other (hereinafter, referred to as an angle of "0 degrees"), a detection width in the detection region of the second human-presence sensor 30 increases with increasing distance from the image processing apparatus 10. Accordingly, regarding a time period $t_{na}$ (see FIG. 8A) taken to pass by the image processing apparatus 10 at a position relatively near the image processing apparatus 10 and a time period $t_{fa}$ (see FIG. 8B) taken to pass by the image processing apparatus 10 at a position relatively distant from the image processing apparatus 10, the time period $t_{fa}$ is longer than the time period $t_{na}$. For example, when the time period $t_{na}$ illustrated in FIG. 8A is considered as a reference, in order to use the time period $t_{fa}$ illustrated in FIG. 8B as the reference, the reference time period $t_1$ needs to be increased by a difference $\Delta a$ ($t_{fa}-t_{na}$) between the time period $t_{fa}$ and the time period $t_{na}$.

Figure 9A:
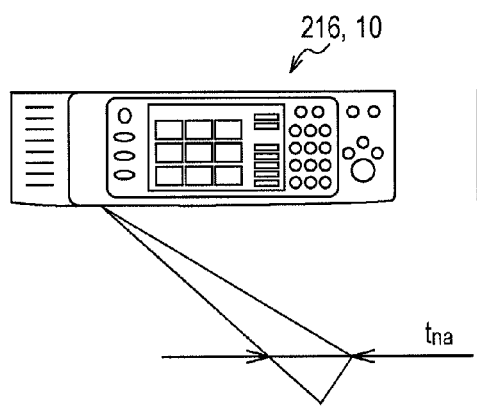
FIGS. 9A and 9B are plan view illustrating relationships between the time period taken to pass by the second human-presence sensor and the detection distance (with inclination)
Figure 9B:
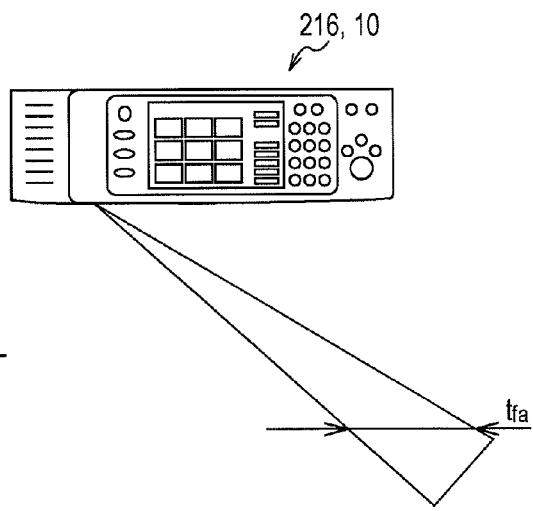

As illustrated in FIGS. 9A and 9B, the same is true for the detection width in the detection region of the second human-presence sensor 30 in a case in which the sensor optical axis of the second human-presence sensor 30 is inclined toward the horizontal direction with respect to the above-mentioned angle of "0 degrees".

Figure 10A:
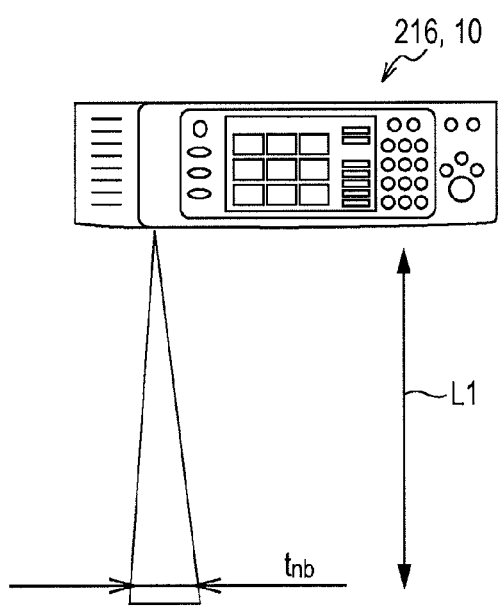
FIGS. 10A and 10B are plan view illustrating relationships between the time period taken to pass by the second human-presence sensor and a detection angle.
Figure 10B:
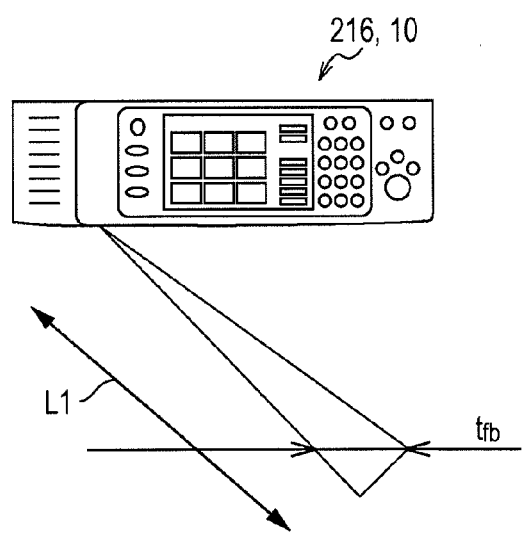

Furthermore, as illustrated in FIGS. 10A and 10B, even when the distances from the image processing apparatus 10 are the same distance L1, regarding a time period $t_{nb}$ (see FIG. 10A) taken to pass by the image processing apparatus 10 at a position at which the above-mentioned angle of "0 degrees" in the horizontal direction is satisfied and a time period $t_{fb}$ (see FIG. 10B) taken to pass by the image processing apparatus 10 at a position at which the sensor optical axis of the second human-presence sensor 30 is inclined with respect to the front face of the image processing apparatus 10, the time period $t_{fb}$ is longer than the time period $t_{nb}$. For example, when the time period $t_{nb}$ illustrated in FIG. 10A is considered as a reference, in order to use the time period $t_{fb}$ illustrated in FIG. 10B as the reference, the reference time period $t_1$ needs to be increased by a difference $\Delta b$ ($t_{fb}-t_{nb}$) between the time period $t_{fb}$ and the time period $t_{nb}$.

Figure 11:
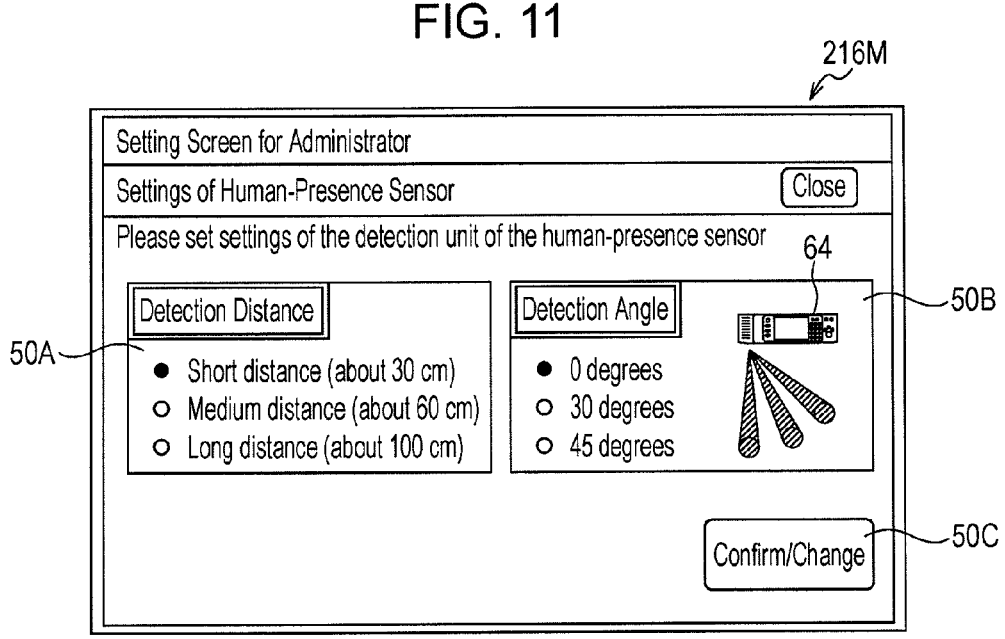
FIG. 11 is a front view of a window screen that is displayed on a display part of a user interface touch panel and that is used to set the detection distance and the detection angle for a human-presence sensor in the present exemplary embodiment.

FIG. 11 illustrates a display screen that is used to input information concerning correction of the reference time period $t_1$ and that is displayed on the UI touch panel 216.

In the top region of a display part 216M of the UI touch panel 216, the title of the contents of information displayed in the display part 216M, an operation method, and so forth are displayed. Two types of window screens, i.e., window screens 50A and 50B, are displayed side by side below the top region of the display part 216M. Furthermore, a button screen 50C for guiding an input-operation (touch-operation) region is displayed below the window screen 50B.

The window screen 50A, which is one of the two window screens, is a screen for setting a detection distance. In the present exemplary embodiment, pieces of character information for distinguishing three types of detection distances, i.e., a relatively "short distance (about 30 cm)", a "medium distance (about 60 cm)", and a "long distance (about 100 cm)", from one another are displayed. A detection distance can be selected among the three types of detection distances. Note that check-box images are displayed so as to correspond to display regions in which the individual pieces of character information are displayed. A user can select one of the detection distances by touching a certain region of the check-box image corresponding to the detection distance (by performing a touch operation) (in FIG. 11, a selected check box is filled with black).

The window screen 50B, which is the other window screen, is a screen for setting a detection angle. In the present exemplary embodiment, pieces of character information for distinguishing three types of detection angles, i.e., the angle of "0 degrees" indicating that the front wall of the image processing apparatus 10 and the sensor optical axis are orthogonal to each other, an angle of "30 degrees" and an angle of "45 degrees" that represent the inclination of the sensor optical axis toward the horizontal direction with respect to the angle of "0 degrees", from one another are displayed. A detection angle can be selected among the three types of detection angles. Note that check-box images are displayed so as to correspond to display regions in which the individual pieces of character information are displayed. A user can select one of the detection angles by touching a certain region of the check-box image corresponding to the detection angle (by performing a touch operation) (in FIG. 11, a selected check box is filled with black).

Note that, in the region of the window screen 50B, a graphic image 52 in which a selected region is displayed is displayed in order to easily visually recognize the selected angle.

After selection in each of the two window screens 50A and 50B is completed, a result of selection is set by touching the inside of the region of the button screen 50C (by performing a touch operation). Furthermore, in a case of changing the settings, it is only necessary to perform a touch operation on the button screen 50C again.

Figure 12:
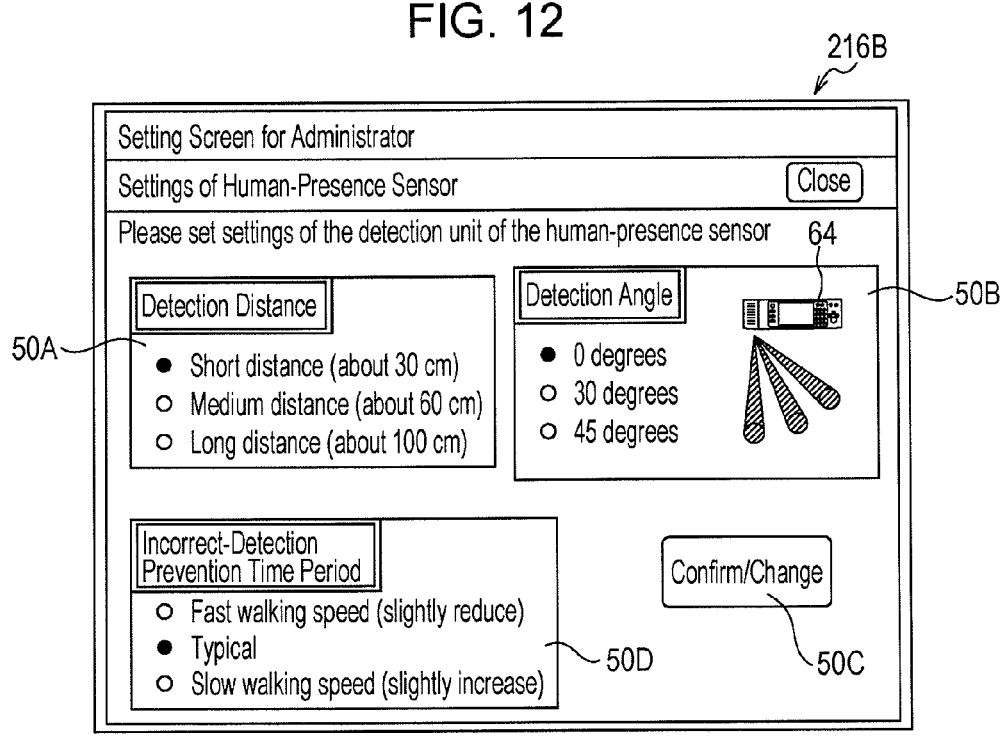
FIG. 12 is a front view of a window screen that is displayed on the display part of the user interface touch panel and that is used to set the detection distance, the detection angle, and an incorrect-detection prevention time period for a human-presence sensor in a modification example.

Note that, as illustrated in FIG. 12, a window screen 50D for selecting a walking speed of a user among a relatively "fast walking speed", a "typical walking speed", and a "slow walking speed" as a selection item may be added. This window screen 50D is a screen for setting an incorrect-detection prevention time period. In this case, by selecting the "fast walking speed", correction is performed so that the reference time period $t_1$ is reduced, and, by selecting the "slow walking speed", correction is performed so that the reference time period $t_1$ is increased. No correction is performed by selecting the "standard walking speed".

Hereinafter, an action in the present exemplary embodiment will be described.

Mode-State Transition for Control of Supply of Power in Image Processing Apparatus 10 (Devices)

First, FIG. 5 is a timing chart illustrating the individual mode states of the image processing apparatus 10 and events that provide opportunities for shifting from one mode state to another mode state among the mode states.

When processing is not performed, regarding the operation state of the image processing apparatus 10, the image processing apparatus 10 enters the sleep mode. In the present exemplary embodiment, power is supplied only to the during-power-saving monitoring control section 24.

Here, when there is an opportunity for cycle-up (when a cycle-up trigger is detected or an input operation (a key input) using the UI touch panel 216 or the like is performed), the operation state of the image processing apparatus 10 is shifted to a warm-up mode.

Note that, after the opportunity for cycle-up such as the cycle-up trigger is provided, this operation state may be defined as one portion of the sleep mode, and only the UI touch panel 216 may be activated. Alternatively, because, due to activation of the UI touch panel 216, the amount of supplied power becomes larger than the amount of power supplied only to the during-power-saving monitoring control section 24, this operation state may be defined as the awake mode "awk" (see description in the curly brackets provided below the range of the sleep mode illustrated in the transition diagram of FIG. 5). In the awake mode, when an input operation (a key input) using the UI touch panel 216 or the like is performed, the operation state of the image processing apparatus 10 is shifted to the warm-up mode.

A signal, a piece of information, or the like that are based on a result of detection performed by the second human-presence sensor 30 is used as the cycle-up trigger. Note that a power-saving cancel operation that is performed by an operator may be used as the cycle-up trigger.

In order to cause the image processing apparatus 10 to promptly enter a state of being capable of performing processing, a power consumption in the warm-up mode is the highest power consumption among power consumptions in the individual modes. However, for example, an induction heating (IH) heater is utilized as a heater of the fixing unit, whereby a warm-up-mode time period is comparatively shorter than that in a case of utilizing a heater using a halogen lamp.

When a warm-up operation in the warm-up mode finishes, the operation state of the image processing apparatus 10 is shifted to the standby mode.

The standby mode is literally a mode state in which "preparation for cases is completed". The image processing apparatus 10 is in a state in which an operation associated with image processing can be immediately performed.

Accordingly, when an operation for performing a job is performed as a key input, the operation state of the image processing apparatus 10 is shifted to a running mode. Image processing based on the specified job is performed.

When image processing finishes (in a case in which multiple sequential jobs wait, when all of the sequential jobs finish), the operation state of the image processing apparatus 10 is shifted to the standby mode by a wait trigger. Note that, after image processing finishes, measurement of a time with the system timer may start, the wait trigger may be output after a time that is determined in advance has elapsed, and the operation state may be shifted to the standby mode.

If an instruction for performing a job is provided during the standby mode, the operation state of the image processing apparatus 10 is shifted to the running mode again. When a cycle-down trigger is detected or when a time that is determined in advance elapses, the operation state of the image processing apparatus 10 is shifted to the sleep mode.

Note that a signal, a piece of information, or the like that are based on a result of detection performed by the second human-presence sensor 30 is used as the cycle-down trigger. Note that the system timer may be used together.

Additionally, shifting the operation state of the image processing apparatus 10 from one mode state to another mode state among the mode states when the image processing apparatus 10 operates in reality is not always performed in a sequential order illustrated in the timing chart. For example, processing may be stopped in the standby mode after the warm-up mode, and, then, the operation state of the image processing apparatus 10 may be shifted to the sleep mode.

Here, each of the devices that operate by receiving supply of power is shifted from the sleep mode via the awake mode and the warm-up mode to the standby mode, which are illustrated in FIG. 5, thereby entering a state of being capable of immediately performing each process.

As described above, the operation state of the image processing apparatus 10 according to the present exemplary embodiment is shifted from one mode state to another mode state among the mode states. The amount of supplied power differs with each of the mode states.

Cycle-Up Control from Sleep Mode

The main controller 200 is in the "all-off mode" or the "pre-off mode" as the sleep mode, depending on the immediately previous state of the image processing apparatus 10.

When the main controller 200 is in the "pre-off mode", the activation time period taken to activate the main controller 200 so that the main controller 200 can correctly function is the activation time period $t_{pre}$. When the main controller 200 is in the "pre-off mode", the activation time period taken to activate the main controller 200 so that the main controller 200 can correctly function is the activation time period $t_{off}$. The activation time period $t_{off}$ and the activation time period $t_{pre}$ have the relationship $t_{off} > t_{pre}$ therebetween.

Here, in a case in which a body capable of movement passes by the vicinity of the image processing apparatus 10, even when the indicator of the second human-presence sensor 30 emits light, after the main controller 200 has been activated, the second human-presence sensor 30 may detect the body capable of movement again or not detect the body capable of movement again (in a case of detection of the body capable of movement for the second time) depending on the state of the sleep mode of the main controller 200.

As described above, this occurs when the above-mentioned time period taken for a body capable of movement to pass by the second human-presence sensor 30 is longer than the activation time period $t_{pre}$ and shorter than the activation time period $t_{off}$.

For this reason, in the present exemplary embodiment, the reference time period that is a time period from when a body capable of movement is detected by the second human-presence sensor 30 to when the body capable of movement is detected by the second human-presence sensor 30 again is set for a mode state corresponding to the longest activation time period among activation time periods. In other words, in the present exemplary embodiment, the two types of activation time periods, i.e., the activation time period $t_{off}$ and the activation time period $t_{pre}$, exist. The activation time period $t_{off}$ and the activation time period $t_{pre}$ have the relationship $t_{off} > t_{pre}$ therebetween. Accordingly, the reference time period is set on the basis of the activation time period $t_{off}$ taken to activate the main controller 200 from the "all-off mode".

Furthermore, the reference time period is corrected on the basis of the detection distance (see FIGS. 8A and 8B), on the basis of the detection angle (see FIGS. 9A and 9B), or on the basis of the detection distance, the detection angle, and the incorrect-detection prevention time period (see FIGS. 10A and 10B) of the second human-presence sensor 30, which are set, whereby both the energy saving performance and the convenience are realized.

Hereinafter, a flow of control for monitoring a body capable of movement, which is performed in the sleep mode, will be described with reference to FIGS. 13 and 14.

Figure 13:
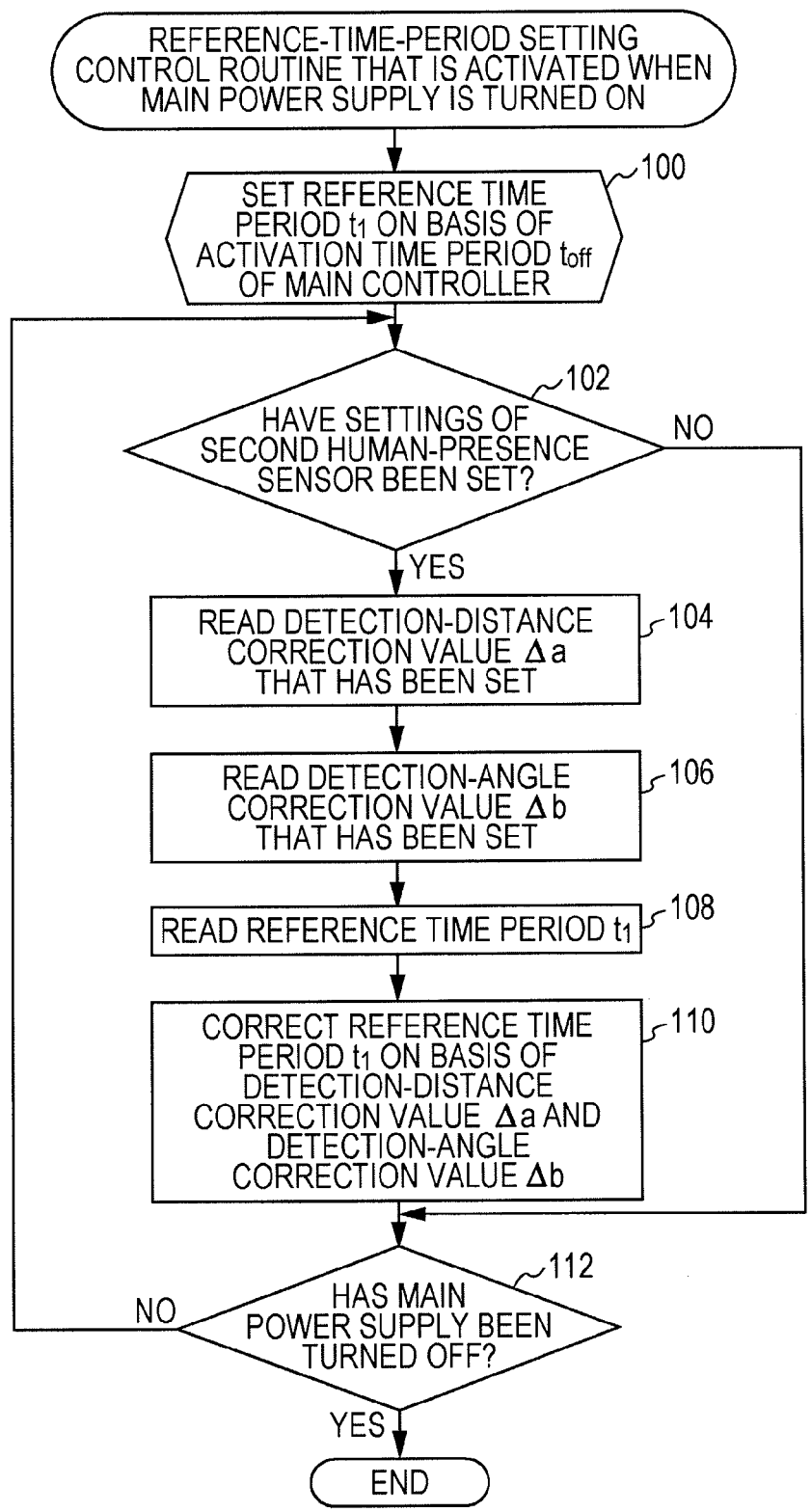
FIG. 13 is a flowchart of a reference-time-period setting control routine that is activated when a main power supply is turned on in the present exemplary embodiment.

FIG. 13 is a flowchart of a reference-time-period setting control routine that is activated when a main power supply is turned on.

When the main power supply of the image processing apparatus 10 is turned on, first, in step 100, the reference time period $t_1$ is set on the basis of the activation time period $t_{off}$ that is taken to activate the main controller 200 from the "all-off mode" and that is the longest activation time period of the main controller 200. Note that the reference time period $t_1$ is set so as to satisfy a condition where the reference time period $t_1$ is longer than the activation time period $t_{off}$, and the upper limit (+α) thereof is not particularly limited.

For example, the reference time period $t_1$ (<−$t_1$+α) may be set on the basis of initial set values of the detection distance and the detection angle of the second human-presence sensor 30. In the present exemplary embodiment, the initial set value of the detection distance of the second human-presence sensor 30 is 30 cm, and the initial set value of the detection angle of the second human-presence sensor 30 is 0 degrees (see FIG. 11 to find the definitions of the values). The reference time period $t_1$ is a time period for a body capable of movement to move from one of the ends of the detection width of the second human-presence sensor 30 to the other end when the body capable of movement moves a position that is located a distance of 30 cm from the front of the image processing apparatus 10 in the horizontal direction (in the left-right direction) with a typical walking speed (see FIG. 12).

Accordingly, a body capable of movement that simply passes by the front of the image processing apparatus 10 and a user who approaches the image processing apparatus 10 in order to use the image processing apparatus 10 can be distinguished from each other.

In step 102 which is the next step, whether or not settings of the second human-presence sensor 30 have been set is determined. In other words, the display screen that is used to set settings and that is illustrated in FIG. 11 is displayed in the display part 216M of the UI touch panel 216, and whether or not settings have been set by a touch operation performed by a user is determined. Note that, here, a description of an operation procedure for setting the detection distance, detection angle, and so forth of the second human-presence sensor 30 is omitted. Furthermore, an operation of setting the detection distance, detection angle, and so forth of the second human-presence sensor 30 may be a remote operation from a PC or the like.

When a result of determination in step 102 is YES, it is determined that the settings of the detection distance, the detection angle, and so forth have been changed by an operation performed by a user, and the process proceeds to step 104.

In step 104, a detection-distance correction value Δa (represented by an expression $t_{fa}-t_{na}$ in FIGS. 8A and 8B and/or FIGS. 9A and 9B), which has been set, is read. Next, the process proceeds to step 106, and a detection-angle correction value Δb (represented by an expression $t_{fb}-t_{nb}$ in FIGS. 10A and 10B), which has been set, is read. Next, the process proceeds to step 108. Note that, in a case in which the incorrect-detection prevention time period based on a walking speed is included as another item, a walking-speed correction value Δc may be additionally set.

In step 108, the present reference time period $t_1$ is read. Next, the process proceeds to step 110, and the reference time period $t_1$ is corrected on the basis of the detection-distance correction value Δa and the detection-angle correction value Δb.

For example, regarding the detection-distance correction value Δa, because the detection width increases as the detection distance becomes longer than the present setting, the reference time period $t_1$ is corrected so that the reference time period $t_1$ is increased. In contrast, because the detection width decreases as the detection distance becomes shorter than the present setting, the reference time period $t_1$ is corrected so that the reference time period $t_1$ is reduced.

Furthermore, regarding the detection-angle correction value Δb, because the detection width increases as the detection angle becomes closer to 90 degrees than the present setting, the reference time period $t_1$ is corrected so that the reference time period $t_1$ is increased. In contrast, because the detection width decreases as the detection angle becomes closer to 0 degrees than the present setting, the reference time period $t_1$ is corrected so that the reference time period $t_1$ is reduced.

When correction of the reference time period $t_1$ in step 110 finishes, the process proceeds to step 112. Furthermore, when it is determined that a result of determination in step 102 is NO, the process proceeds to step 112.

In step 112, whether or not the main power supply has been turned off is determined. When a result of determination in step 112 is NO, the process returns to step 102 while the present reference time period $t_1$ is being kept. Furthermore, when a result of determination in step 112 is YES, the reference-time-period setting control routine finishes.

Note that, in the present exemplary embodiment, the reference-time-period setting control routine finishes, whereby the reference time period is initialized when the main power supply is next turned off. However, the reference time period $t_1$ that has been changed and set may be stored in a non-volatile memory, and the reference time period $t_1$ stored in the non-volatile memory may be used as an initial value when the main power is next turned on.

Figure 14:
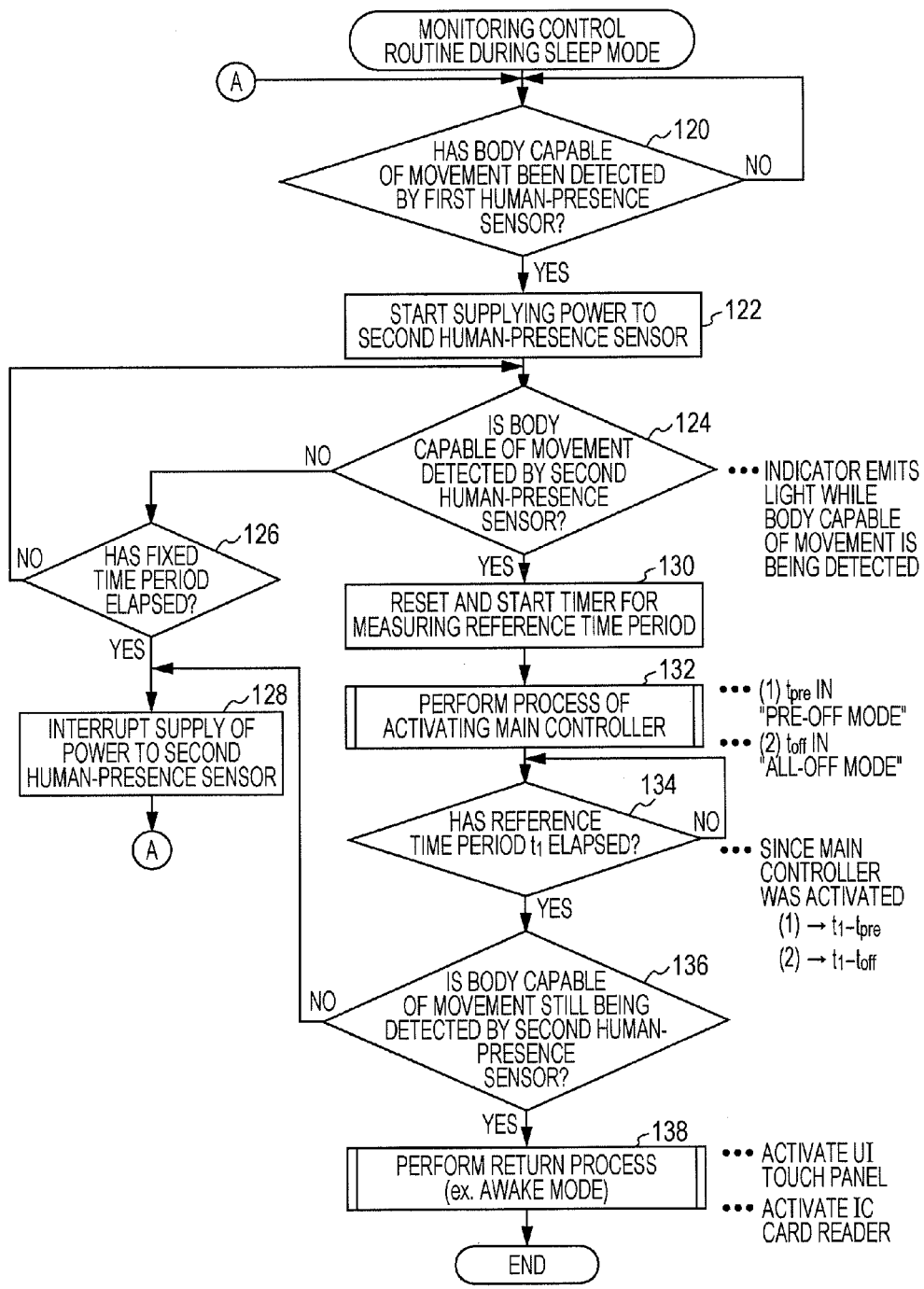
FIG. 14 is a flowchart of a monitoring control routine using the second human-presence sensor during the sleep mode in the present exemplary embodiment.

Next, FIG. 14 is a flowchart of a monitoring control routine using the second human-presence sensor 30 during the sleep mode.

When the image processing apparatus 10 enters the sleep mode, basically, the first human-presence sensor 28 performs monitoring, and the second human-presence sensor 30 is in the non-power-supply state.

In step 120, whether or not a body capable of movement has been detected by the first human-presence sensor 28 is determined. When a result of determination is YES, the process proceeds to step 122, and supply of power to the second human-presence sensor 30 starts. Accordingly, the second human-presence sensor 30 enters a state of being capable of detecting a body capable of movement.

Next, in step 124, whether or not the body capable of movement is detected by the second human-presence sensor 30 is determined. When a result of determination is NO, the process proceeds to step 126, and whether or not a state in which no body capable of movement is detected has continued for a fixed time period (a fixed time has elapsed) since supply of power to the second human-presence sensor 30 started. When a result of determination is NO, the process returns to step 124, and detection of the body capable of movement with the second human-presence sensor 30 continues. Furthermore, when a result of determination in step 126 is YES, the process proceeds to step 128. Supply of power to the second human-presence sensor 30 is interrupted, and the process returns to step 120. Note that, in this case, when the body capable of movement does not exist in the detection region of the second human-presence sensor 30 but exists in the detection region of the first human-presence sensor 28, power may be supplied to the second human-presence sensor 30 again. Accordingly, a time period for which the first human-presence sensor 28 is ineffective or the like may be provided for the first human-presence sensor 28 with consideration of a time period taken for a user to leave the detection region of the first human-presence sensor 28.

When a result of determination in step 124 is YES, i.e., the body capable of movement is detected by the second human-presence sensor 30, the process proceeds to step 130, and a timer for measuring the reference time period $t_1$ is reset and started. Note that the second human-presence sensor 30 includes the indicator for detection and monitoring, and the indicator emits light while the second human-presence sensor 30 is detecting a body capable of movement.

In step 132 which is the next step, activation of the main controller 200 starts. Next, the process proceeds to step 134, and whether or not the reference time period $t_1$ has elapsed is determined. When a result of determination in step 134 is YES, the process proceeds to step 136, and the state of detection of the body capable of movement with the second human-presence sensor 30 is checked again. In other words, whether or not the body capable of movement is still being detected after the body capable of movement is first detected.

When a result of determination in step 136 is YES, it is determined that the body capable of movement detected by the second human-presence sensor 30 is a user who intends to use the image processing apparatus 10. The process proceeds to step 138, and a return process is performed. For example, an instruction for shifting to the awake mode is provided, whereby power is supplied to the UI touch panel 216 or the IC card reader 217. Accordingly, a user can input necessary information, and the operation state of the image processing apparatus 10 can be shifted to the next mode state (for example, the standby mode).

Furthermore, when a result of determination in step 136 is NO, it is determined that the body capable of movement detected first does not intend to use the image processing apparatus 10 and is a body capable of movement which simply passes by the image processing apparatus 10. The process proceeds to step 128, and supply of power to the second human-presence sensor 30 is interrupted.

Correction of Monitoring in Accordance with Type of Sleep Mode

The activation time period of the main controller 200 in step 132 illustrated in FIG. 14 differs in accordance with the type of sleep mode.

In other words, the sleep mode (excluding the awake mode) is classified into the "all-off mode" and the "pre-off mode". In the "all-off mode", the process of initializing the CPU, the wait time until the processing clock is stabilized, and so forth are necessary in the case of activating the main controller 200. In the "pre-off mode", the process of initializing the CPU, the wait time until the processing clock is stabilized, and so forth are unnecessary in the case of activating the main controller 200.

In any case, at a point in time when the main controller 200 enters a state of being capable of performing processing, the reference time period $t_1$ has not yet elapsed. Accordingly, even when the time period taken to activate the main controller 200 differs, determination of whether the body capable of movement is detected again by the second human-presence sensor 30 (see step 136 in FIG. 14) can be performed under the same condition (the reference time period $t_1$).

Moreover, it is only necessary to set the reference time period $t_1$ on the basis of the longest activation time period of the main controller 200. Accordingly, the convenience can be maintained.

Further, in the present exemplary embodiment, the reference time period $t_1$ may be corrected in accordance with an attachment condition of the second human-presence sensor 30 (the detection distance and the detection angle) (see FIG. 11). Moreover, in addition to the detection distance and the detection angle, the reference time period $t_1$ may be corrected in accordance with the moving speed of a user that changes in accordance with the place in which the image processing apparatus 10 is disposed, the occupation of the user, or the like (see FIG. 12). Accordingly, the reference time period $t_1$ can be set so that not only the convenience but also the energy saving performance is realized.

Note that, in the present exemplary embodiment, a body capable of movement is detected by the second human-presence sensor 30 during the sleep mode, and the number of times the body capable of movement is detected again after the process of activating the main controller 200 is completed is only one (see FIG. 15A). However, as illustrated in FIG. 15B, after the process of activating the main controller 200 is completed, detection may be regularly or irregularly performed multiple times (here, three times, i.e., $t_1(1)$, $t_2(2)$, and $t_3(3)$). Activation of the main controller 200 from the "pre-off mode" is described as an example with reference to FIG. 15B. However, also in the case of activating the main controller 200 from the "all-off mode", detection may be performed multiple times.

Furthermore, in the present exemplary embodiment, the reference time period $t_1$ is corrected in accordance with the detection distance, the detection angle, the moving speed of a user, or the like. However, whether a result of detection performed in reality after the reference time period $t_1$ has been corrected is correct or incorrect may be determined to obtain a determination result, the determination result may be recorded as a history, and the reference time period $t_1$ may be further corrected in accordance with the determination result (hereinafter, may be referred to as "learning and correction").

FIGS. 16A, 16B, 17A, and 17B illustrate examples in which leaning and correction is performed in the "pre-off mode" supposing that a body capable of movement passes by or approaches the image processing apparatus 10. Note that learning and correction may similarly be performed in the "all-off mode" although a description of learning and correction in the "all-off mode" is omitted.

A Case in which Image Processing Apparatus 10 is not Used and which is Represented by Phrase "Passing by Image Processing Apparatus 10"

Figure 16A:
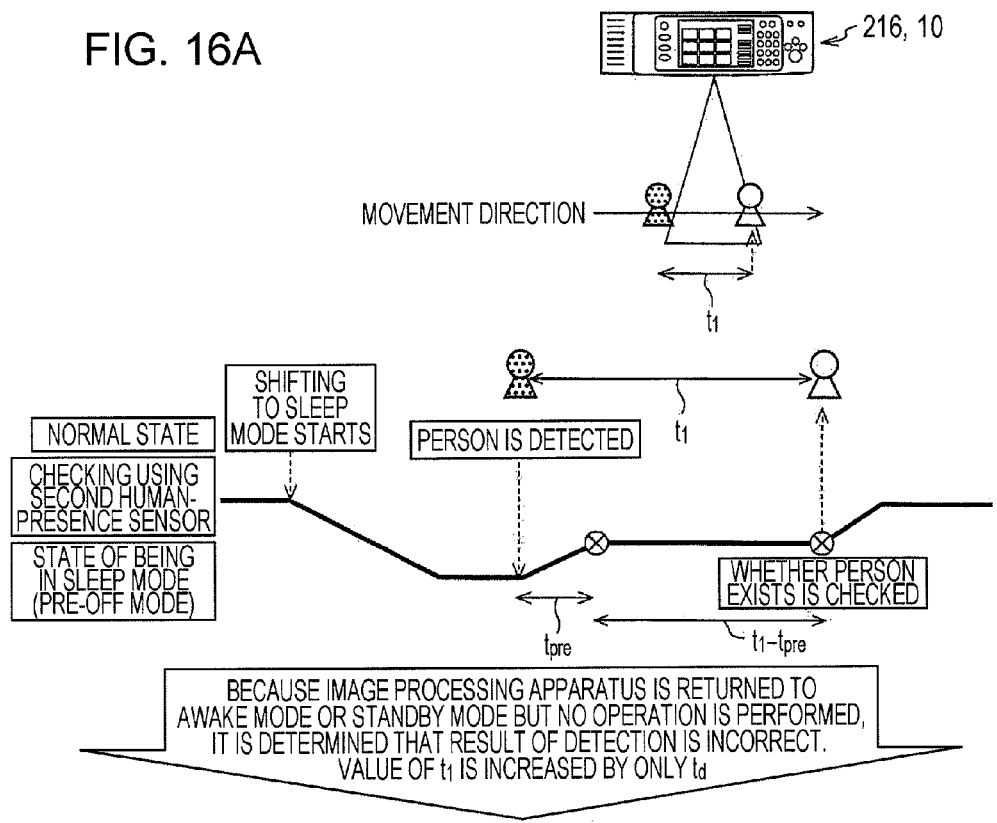
FIGS. 16A and 16B are timing charts for performing learning and correction of the reference time period in a modification example (an increase in the reference time period)
Figure 16B:
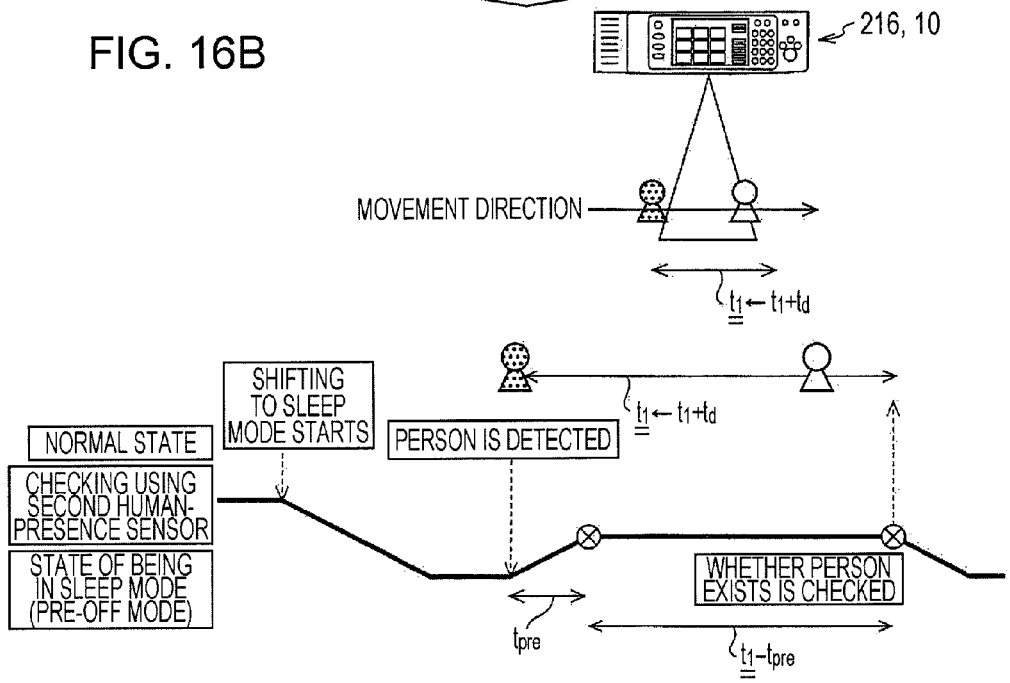

As illustrated in FIG. 16A, the following case is supposed: existence of a user is confirmed by detecting the user with the second human-presence sensor 30 again (within a time period represented by an expression $t_1-t_{pre}$) to obtain a result of detection; for example, the operation state of the image processing apparatus 10 is returned to the awake mode or the standby mode (see FIG. 5); and, however, no operation is performed. In this case, it is determined that the result of detection is incorrect, and, as illustrated in FIG. 16B, correction of the reference time period $t_1$ is performed so that the reference time period $t_1$ is increased ($t_1 \leftarrow t_1+t_d$).

A Case in which Image Processing Apparatus 10 is Used and which is Represented by Phrase "Approaching Image Processing Apparatus 10"

Figure 17A:
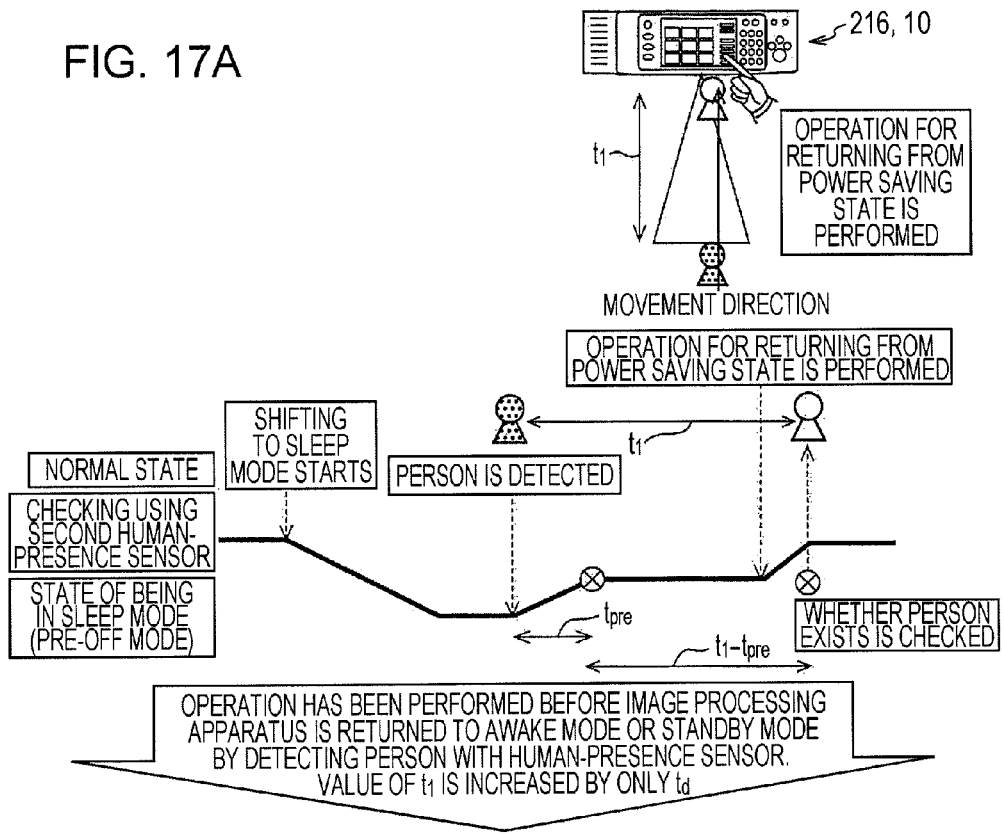
FIGS. 17A and 17B are timing charts for performing learning and correction of the reference time period in a modification example (a reduction in the reference time period).
Figure 17B:
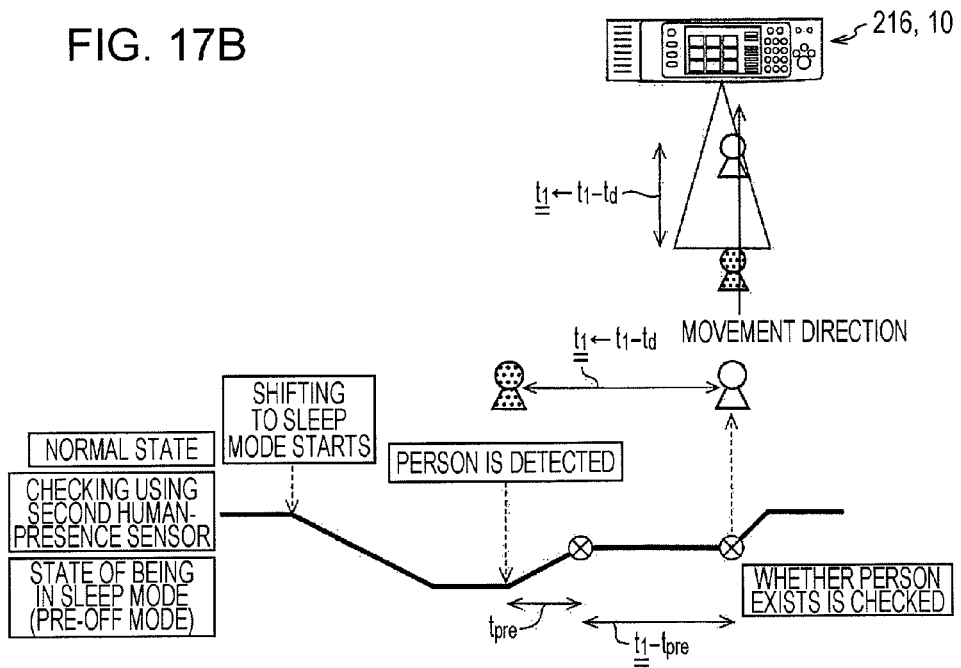

As illustrated in FIG. 17A, the following case is supposed: existence of a user is confirmed by detecting a user with the second human-presence sensor 30 again (within a time period represented by an expression $t_1-t_{pre}$) to obtain a result of detection; and, however, an operation has been performed before, for example, the image processing apparatus 10 is returned to the awake mode or the standby mode (see FIG. 5). In this case, it is determined that the result of detection is incorrect, and, as illustrated in FIG. 17B, correction of the reference time period $t_1$ is performed so that the reference time period $t_1$ is reduced ($t_1 \leftarrow t_1-t_d$). In this case, in order to determine whether or not an operation has been performed before the image processing apparatus 10 is returned to the awake mode or the standby mode, when supply of power to the main controller 200 starts, power needs to be also supplied to the UI touch panel 216 and the IC card reader 217.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power-supply control device comprising:
a transition section that shifts a state of an operation target section to a power-supply state or one of a plurality of types of non-power-supply states, and that, in a case of shifting the state of the operation target section to a non-power-supply state, selects a non-power-supply state among the plurality of types of non-power-supply states and shifts the state of the operation target section to the selected non-power-supply state, the operation target section being a section which operates by receiving supply of power from a power source section, the power-supply state being a state in which power is supplied to the operation target section, each of the plurality of types of non-power-supply states being a state in which supply of power to the operation target section is interrupted, shifting from each of the plurality of types of non-power-supply states to the power-supply state taking a corresponding one of return time periods that are relatively different from one another;
a body-capable-of-movement detection section that detects a body capable of movement including a user who intends to use the operation target section;
a return control section that, when the body capable of movement is detected by the body-capable-of-movement detection section in each of the plurality of types of non-power-supply states, performs a return process of controlling the transition section so as to return the state of the operation target section to the power-supply state, the return process taking each of activation time periods from a time at which the return process starts to a time at which the return process finishes in a corresponding one of the plurality of types of non-power-supply states;
a reference-time-period setting section that sets a reference time period on the basis of a longest activation time period among the activation time periods corresponding to the plurality of types of non-power-supply states, the reference time period being used for a time at which detection of the body capable of movement with the body-capable-of-movement detection section is performed again;
a state determination section that checks a state of detection of the body capable of movement with the body-capable-of-movement detection section after the reference time period set by the reference-time-period setting section has elapsed from the time at which the return process started, and that determines whether the state of the operation target section which is the power-supply state is to be kept or the state of the operation target section is to be returned to one of the plurality of types of non-power-supply states by controlling the transition section; and
a correction section that corrects the reference time period on the basis of detection position information concerning a position at which the body capable of movement is detected by the body-capable-of-movement detection section.

2. The power-supply control device according to claim 1, wherein the operation target section is a main controller that collectively controls processes of a plurality of processing sections, a first state and a second state are set as states in which the main controller is at least in a non-power-supply state among the plurality of types of non-power-supply states, the first state being a state in which no power is supplied to the main controller and in which an initialization process is necessary in a case of returning the state of the operation target section to the power-supply state, the second state being a state in which power is supplied to one portion of the main controller and in which the initialization process is unnecessary in the case of returning the state of the operation target section to the power-supply state, and the return time period in a case in which the main controller is in the first state is longer than the return time period in a case in which the main controller is in the second state.

3. The power-supply control device according to claim 2, wherein the plurality of types of non-power-supply states are able to be set so as to differ with whether the main controller is in the first state or the second state.

4. The power-supply control device according to claim 1, wherein detection of the body capable of movement is performed a plurality of times within the reference time period, and information concerning detection performed the plurality of times is used as a basis for determination performed by the state determination section.

5. The power-supply control device according to claim 1, further comprising
a correct-incorrect checking section that checks whether a result of determination which is performed by the state determination section on the basis of the reference time period corrected by the correction section is correct or incorrect,
wherein the reference time period is further corrected by the correction section on the basis of information concerning checking performed by the correct-incorrect checking section.

6. The power-supply control device according to claim 1, further comprising an input section that inputs basic information including a detection distance and a detection angle which are used to determine a region that is to be utilized as the detection position information from a detection region of the body-capable-of-movement detection section, the detection region extending as a three-dimensional space.

7. The power-supply control device according to claim 6, wherein the basic information includes a typical moving speed of the body capable of movement that moves in the detection region of the body-capable-of-movement detection section.

8. The power-supply control device according to claim 6, wherein the input section includes a display that is used to choose among a plurality of alternatives for each item included in the basic information, and the input section is an interactive input device that is used to choose among the plurality of alternatives while looking at a screen displayed on the display.

9. The power-supply control device according to claim 2, wherein, regardless of the first or second state of the main controller, the plurality of types of non-power-supply states include at least a sleep mode in which power is supplied to a control system necessary for operation of the body-capable-of-movement detection section and detection using the body-capable-of-movement detection section.

10. The power-supply control device according to claim 9, wherein the power-supply state includes at least a standby mode, a running mode, and a low-power mode, the standby mode being a state in which power lower than steady-state power is supplied to, among the plurality of processing sections, a processing section that performs a predetermined process, the running mode being a state in which the steady-state power is supplied to the processing section, the low-power mode being a state in which a power consumption that is lower than a power consumption in the standby mode and that is higher than a power consumption in the sleep mode is kept.

11. An image processing apparatus comprising:
the power-supply control device according to claim 1; and
at least one of an image reading section, an image forming section, a facsimile-communication control section, a user interface section, and a user identifying device, the image reading section reading an image from a document image, the image forming section forming an image on a recording sheet on the basis of image information, the facsimile-communication control section transmitting an image to a transmission destination in accordance with a communication procedure which is mutually determined in advance, the user interface section receiving information from the user which is a portion of the body capable of movement and notifying the user of information, the user identifying device being used to identify the user,
wherein the image reading section, the image forming section, the facsimile-communication control section, the user interface section, and the user identifying device perform, in accordance with an instruction provided from the user, image processing by cooperating with each other, and the body-capable-of-movement detection section is installed with respect to an installation position of the user interface section or the user identifying device.

12. A power-supply control method comprising:
shifting a state of an operation target section from one state to another state among a power-supply state and a plurality of types of non-power-supply states, and selecting a non-power-supply state among the plurality of types of non-power-supply states and shifting the state of the operation target section to the selected non-power-supply state in a case of shifting the state of the operation target section to a non-power-supply state, the operation target section being a section which operates by receiving supply of power from a power source section, the power-supply state being a state in which power is supplied to the operation target section, each of the plurality of types of non-power-supply states being a state in which supply of power to the operation target section is interrupted, shifting from each of the plurality of types of non-power-supply states to the power-supply state taking a corresponding one of return time periods that are relatively different from one another;
performing, when a body capable of movement including a user who intends to use the operation target section is detected by a body-capable-of-movement detection section in each of the plurality of types of non-power-supply states, a return process of controlling the shifting so as to return the state of the operation target section to the power-supply state, the return process taking each of activation time periods from a time at which the return process starts to a time at which the return process finishes in a corresponding one of the plurality of types of non-power-supply states;
setting a reference time period on the basis of a longest activation time period among the activation time periods corresponding to the plurality of types of non-power-supply states, the reference time period being used for a time at which detection of the body capable of movement with the body-capable-of-movement detection section is performed again;
checking a state of detection of the body capable of movement with the body-capable-of-movement detection section after the set reference time period has elapsed from the time at which the return process started, and determining whether the state of the operation target section which is the power-supply state is to be kept or the state of the operation target section is to be returned to one of the plurality of types of non-power-supply states by controlling the shifting; and
correcting the reference time period on the basis of detection position information concerning a position at which the body capable of movement is detected by the body-capable-of-movement detection section.

13. A non-transitory computer-readable medium storing a program causing a computer to execute a process, the process comprising:
shifting a state of an operation target section from one state to another state among a power-supply state and a plurality of types of non-power-supply states, and selecting a non-power-supply state among the plurality of types of non-power-supply states and shifting the state of the operation target section to the selected non-power-supply state in a case of shifting the state of the operation target section to a non-power-supply state, the operation target section being a section which operates by receiving supply of power from a power source section, the power-supply state being a state in which power is supplied to the operation target section, each of the plurality of types of non-power-supply states being a state in which supply of power to the operation target section is interrupted, shifting from each of the plurality of types of non-power-supply states to the power-supply state taking a corresponding one of return time periods that are relatively different from one another;
performing, when a body capable of movement including a user who intends to use the operation target section is detected by a body-capable-of-movement detection section in each of the plurality of types of non-power-supply states, a return process of controlling the shifting so as to return the state of the operation target section to the power-supply state, the return process taking each of activation time periods from a time at which the return process starts to a time at which the return process finishes in a corresponding one of the plurality of types of non-power-supply states;
setting a reference time period on the basis of a longest activation time period among the activation time periods corresponding to the plurality of types of non-power-supply states, the reference time period being used for a time at which detection of the body capable of movement with the body-capable-of-movement detection section is performed again;
checking a state of detection of the body capable of movement with the body-capable-of-movement detection section after the set reference time period has elapsed from the time at which the return process started, and determining whether the state of the operation target section which is the power-supply state is to be kept or the state of the operation target section is to be returned to one of the plurality of types of non-power-supply states by controlling the shifting; and
correcting the reference time period on the basis of detection position information concerning a position at which the body capable of movement is detected by the body-capable-of-movement detection section.

* * * * *